(12) United States Patent
Mori et al.

(10) Patent No.: US 7,656,594 B2
(45) Date of Patent: Feb. 2, 2010

(54) COLOR IMAGE READOUT LENS AND COLOR IMAGE READOUT APPARATUS

(75) Inventors: Masao Mori, Saitama (JP); Yu Kitahara, Saitama (JP); Ryoko Otomo, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 9 days.

(21) Appl. No.: 12/134,088

(22) Filed: Jun. 5, 2008

(65) Prior Publication Data

US 2009/0002850 A1    Jan. 1, 2009

(30) Foreign Application Priority Data

Jun. 26, 2007    (JP)    ............... P2007-168011

(51) Int. Cl.
G02B 9/12    (2006.01)
G02B 5/18    (2006.01)
G02B 3/08    (2006.01)

(52) U.S. Cl. .............. 359/784; 359/558; 359/742

(58) Field of Classification Search .......... 359/558, 359/566, 714, 716, 742, 763, 784; 369/112.03, 369/112.08

See application file for complete search history.

(56) References Cited

U.S. PATENT DOCUMENTS

| | | | |
|---|---|---|---|
| 5,930,043 A * | 7/1999 | Ogawa | ............ 359/566 |
| 5,959,785 A | 9/1999 | Adachi | |
| 6,208,474 B1 | 3/2001 | Kondo | |

FOREIGN PATENT DOCUMENTS

| CN | 2552026 Y | 5/2003 |
|---|---|---|
| JP | 10-311946 A | 11/1998 |
| JP | 10-339843 A | 12/1998 |
| JP | 2000-66093 A | 3/2000 |
| JP | 2007-94278 A | 4/2007 |

* cited by examiner

*Primary Examiner*—William C Choi
(74) *Attorney, Agent, or Firm*—Birch, Stewart, Kolasch & Birch, LLP

(57) ABSTRACT

A color image readout lens comprises, in order from an object side: a first group comprising a positive lens convex toward the object side and a biconcave negative lens; a stop; a second group comprising one diffractive optical element that has at least one flat surface and has a diffractive structure formed on the flat surface; and a third group comprising a biconvex positive lens and a negative lens concave toward the object side.

20 Claims, 29 Drawing Sheets

EXAMPLE 1

EXAMPLE 3

EXAMPLE 4

EXAMPLE 6

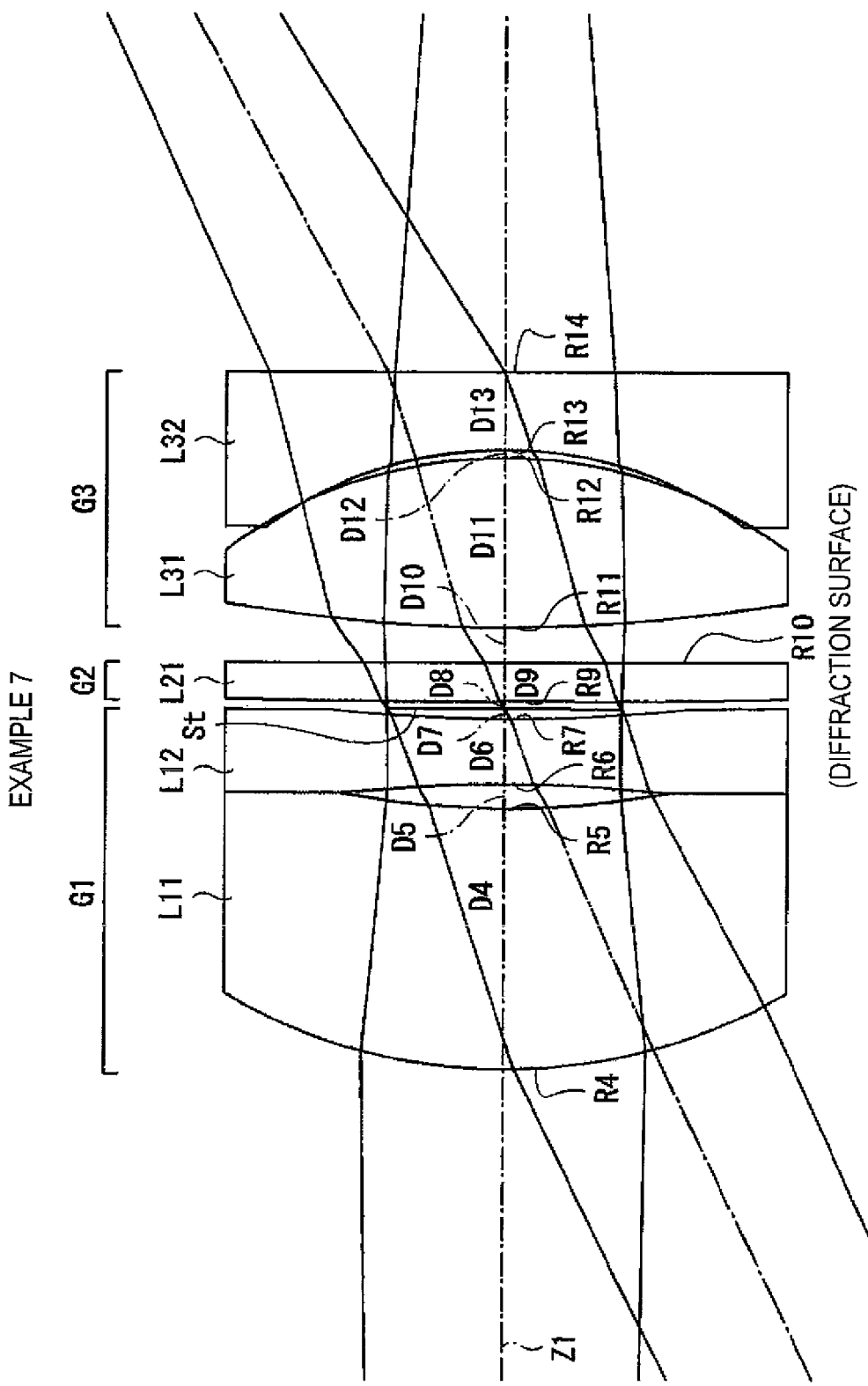

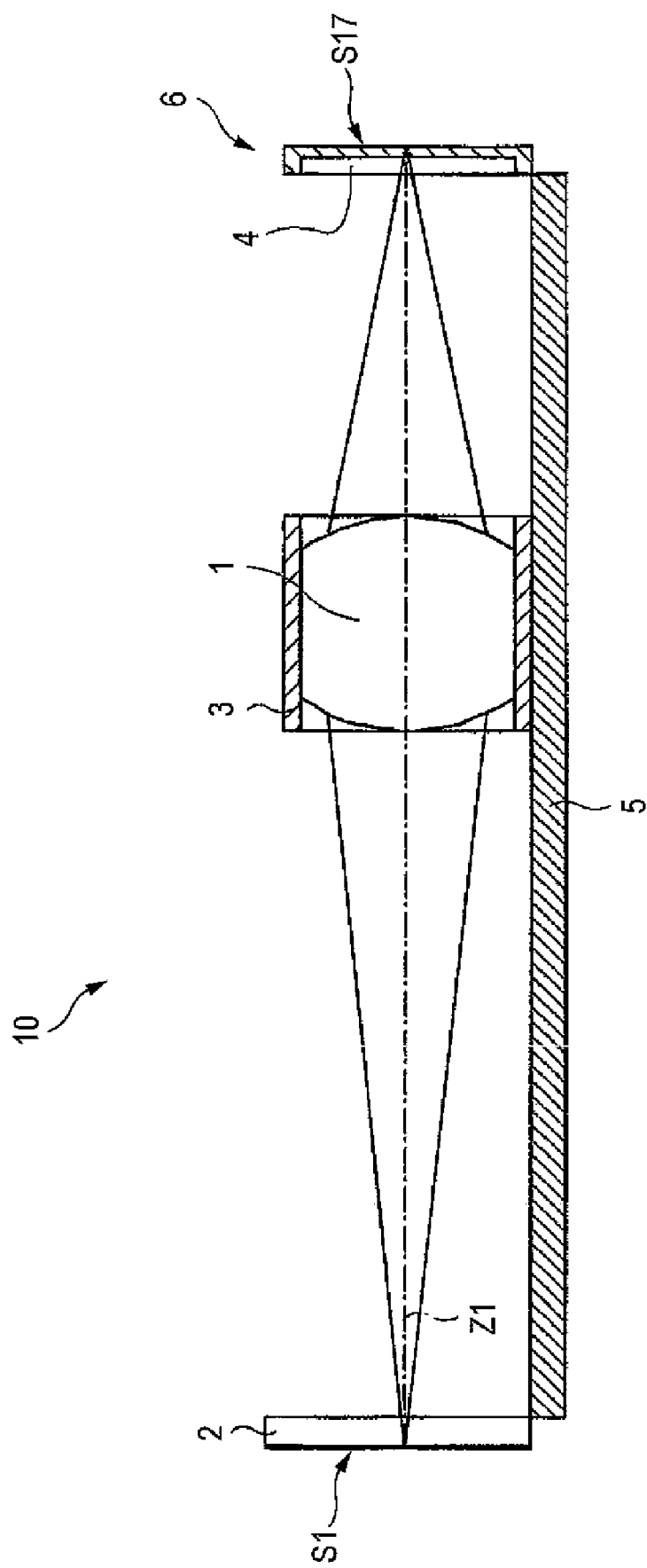

FIG. 9A

| | EXAPLE 1: LENS DATA | | | | |
|---|---|---|---|---|---|
| | Si (SURFACE NUMBER) | Ri (RADIUS OF CURVATURE) | Di (ON-AXIS SURFACE SPACING) | Nej (REFRACTIVE INDEX) | νdj (ABBE NUMBER) |
| | 1 (SUBJECT SURFACE) | ∞ | 0.00 | | |
| | 2 | ∞ | 2.80 | 1.52458 | 59.6 |
| | 3 | ∞ | 245.02 | | |
| G1 | 4 | 11.177 | 3.50 | 1.62033 | 63.4 |
| G1 | 5 | 51.856 | 0.49 | | |
| G1 | 6 | -65.017 | 2.56 | 1.65803 | 39.7 |
| G1 | 7 | 11.800 | 1.04 | | |
| | 8 (APERTURE DIAPHRAGM) | — | 0.20 | | |
| G2 | 9 | ∞ | 1.00 | 1.51169 | 56.7 |
| G2 | 10 (DIFFRACTION SURFACE) | ∞ | 0.20 | | |
| G3 | 11 | 27.318 | 4.77 | 1.83932 | 37.2 |
| G3 | 12 | -10.064 | 0.21 | | |
| G3 | 13 | -9.135 | 2.68 | 1.65222 | 33.8 |
| G3 | 14 | 179.342 | 34.33 | | |
| | 15 | ∞ | 0.70 | 1.51872 | 64.2 |
| | 16 | ∞ | 0.50 | | |
| | 17 (LIGHT RECEIVING SURFACE) | ∞ | 0.00 | | |

FIG. 9B

| EXAPLE 1: PHASE DIFFERENCE FUNCTION COEFFICIENT | |
|---|---|
| C1 | -5.33445E+00 |
| C2 | 1.53843E-01 |
| C3 | -2.43858E-02 |
| C4 | 3.33565E-03 |
| C5 | -2.35368E-04 |

FIG. 10A

| | EXAPLE 2: LENS DATA | | | | |
|---|---|---|---|---|---|
| | Si (SURFACE NUMBER) | Ri (RADIUS OF CURVATURE) | Di (ON-AXIS SURFACE SPACING) | Nej (REFRACTIVE INDEX) | $\nu dj$ (ABBE NUMBER) |
| | 1 (SUBJECT SURFACE) | ∞ | 0.00 | | |
| | 2 | ∞ | 2.80 | 1.52458 | 59.6 |
| | 3 | ∞ | 241.50 | | |
| G1 | 4 | 10.193 | 4.01 | 1.62033 | 63.4 |
| | 5 | 10.644 | 0.85 | | |
| | 6 | -20.523 | 1.70 | 1.59667 | 35.3 |
| | 7 | 440.502 | 0.27 | | |
| | 8 (APERTURE DIAPHRAGM) | — | 0.20 | | |
| G2 | 9 | ∞ | 1.00 | 1.51169 | 56.7 |
| | 10 (DIFFRACTION SURFACE) | ∞ | 0.20 | | |
| G3 | 11 | 35.564 | 5.20 | 1.80922 | 39.6 |
| | 12 | -9.437 | 0.21 | | |
| | 13 | -8.348 | 2.00 | 1.67765 | 32.1 |
| | 14 | -41.032 | 38.91 | | |
| | 15 | ∞ | 0.70 | 1.51872 | 64.2 |
| | 16 | ∞ | 0.50 | | |
| | 17 (LIGHT RECEIVING SURFACE) | ∞ | 0.00 | | |

FIG. 10B

| EXAPLE 2: PHASE DIFFERENCE FUNCTION COEFFICIENT | |
|---|---|
| C1 | -5.33445E+00 |
| C2 | 1.53843E-01 |
| C3 | -2.43858E-02 |
| C4 | 3.33565E-03 |
| C5 | -2.35368E-04 |

FIG. 11A

| | EXAPLE 3: LENS DATA | | | | |
|---|---|---|---|---|---|
| | Si (SURFACE NUMBER) | Ri (RADIUS OF CURVATURE) | Di (ON-AXIS SURFACE SPACING) | Nej (REFRACTIVE INDEX) | νdj (ABBE NUMBER) |
| | 1 (SUBJECT SURFACE) | ∞ | 0.00 | | |
| | 2 | ∞ | 2.80 | 1.52458 | 59.6 |
| | 3 | ∞ | 244.51 | | |
| G1 | 4 | 11.371 | 3.12 | 1.75844 | 52.3 |
| G1 | 5 | 87.056 | 0.46 | | |
| G1 | 6 | −79.342 | 2.14 | 1.88815 | 40.8 |
| G1 | 7 | 11.767 | 1.19 | | |
| | 8 (APERTURE DIAPHRAGM) | — | 0.26 | | |
| G2 | 9 (DIFFRACTION SURFACE) | ∞ | 1.00 | 1.51169 | 56.7 |
| G2 | 10 | ∞ | 0.20 | | |
| G3 | 11 | 35.730 | 4.53 | 1.88815 | 40.8 |
| G3 | 12 | −10.005 | 0.20 | | |
| G3 | 13 | −9.317 | 3.50 | 1.67402 | 39.3 |
| G3 | 14 | −36908.086 | 34.94 | | |
| | 15 | ∞ | 0.70 | 1.51872 | 64.2 |
| | 16 | ∞ | 0.50 | | |
| | 17 (LIGHT RECEIVING SURFACE) | ∞ | 0.00 | | |

FIG. 11B

| EXAPLE 3: PHASE DIFFERENCE FUNCTION COEFFICIENT | |
|---|---|
| C1 | −1.04064E+01 |
| C2 | 1.16322E−01 |
| C3 | −1.58146E−02 |
| C4 | 2.27083E−03 |
| C5 | −1.74703E−04 |

FIG. 12A

| Si (SURFACE NUMBER) | Ri (RADIUS OF CURVATURE) | Di (ON-AXIS SURFACE SPACING) | Nej (REFRACTIVE INDEX) | νdj (ABBE NUMBER) |
|---|---|---|---|---|
| 1 (SUBJECT SURFACE) | ∞ | 0.00 | | |
| 2 | ∞ | 2.80 | 1.52458 | 59.6 |
| 3 | ∞ | 244.45 | | |
| 4 | 11.091 | 5.48 | 1.51825 | 64.1 |
| 5 | 32.233 | 0.43 | | |
| 6 | -47.084 | 1.62 | 1.65803 | 39.7 |
| 7 | 16.661 | 0.55 | | |
| 8 (APERTURE DIAPHRAGM) | — | 0.20 | | |
| 9 (DIFFRACTION SURFACE) | ∞ | 1.00 | 1.51169 | 56.7 |
| 10 | ∞ | 0.58 | | |
| 11 | 26.979 | 5.69 | 1.83932 | 37.2 |
| 12 | -10.399 | 0.30 | | |
| 13 | -8.818 | 1.28 | 1.62409 | 36.3 |
| 14 | 335.288 | 34.48 | | |
| 15 | ∞ | 0.70 | 1.51872 | 64.2 |
| 16 | ∞ | 0.50 | | |
| 17 (LIGHT RECEIVING SURFACE) | ∞ | 0.00 | | |

G1: surfaces 4–7
G2: surfaces 9–10
G3: surfaces 11–14

FIG. 12B

| EXAPLE 4: PHASE DIFFERENCE FUNCTION COEFFICIENT | |
|---|---|
| C1 | -1.19941E+01 |
| C2 | 2.27161E-01 |
| C3 | -3.26119E-02 |
| C4 | 3.94693E-03 |
| C5 | -2.74928E-04 |

FIG. 13A

| Si (SURFACE NUMBER) | | Ri (RADIUS OF CURVATURE) | Di (ON-AXIS SURFACE SPACING) | Nej (REFRACTIVE INDEX) | νdj (ABBE NUMBER) |
|---|---|---|---|---|---|
| | 1 (SUBJECT SURFACE) | ∞ | 0.00 | | |
| | 2 | ∞ | 2.80 | 1.52458 | 59.6 |
| | 3 | ∞ | 243.90 | | |
| G1 | 4 | 11.504 | 4.29 | 1.65425 | 58.5 |
| G1 | 5 | 59.850 | 0.40 | | |
| G1 | 6 | -66.006 | 1.70 | 1.76651 | 40.1 |
| G1 | 7 | 12.851 | 1.17 | | |
| | 8 (APERTURE DIAPHRAGM) | — | 0.20 | | |
| G2 | 9 (DIFFRACTION SURFACE) | ∞ | 1.00 | 1.51169 | 56.7 |
| G2 | 10 | ∞ | 0.20 | | |
| G3 | 11 | 32.721 | 5.28 | 1.90425 | 34.0 |
| G3 | 12 | -9.996 | 0.20 | | |
| G3 | 13 | -9.126 | 3.50 | 1.70442 | 30.1 |
| G3 | 14 | 1988.946 | 34.22 | | |
| | 15 | ∞ | 0.70 | 1.51872 | 64.2 |
| | 16 | ∞ | 0.50 | | |
| | 17 (LIGHT RECEIVING SURFACE) | ∞ | 0.00 | | |

FIG. 13B

| EXAPLE 5: PHASE DIFFERENCE FUNCTION COEFFICIENT | |
|---|---|
| C1 | -7.83200E+00 |
| C2 | 1.38862E-01 |
| C3 | -1.99250E-02 |
| C4 | 2.81888E-03 |
| C5 | -2.15255E-04 |

FIG. 14A

| | EXAPLE 6: LENS DATA | | | |
|---|---|---|---|---|
| Si (SURFACE NUMBER) | Ri (RADIUS OF CURVATURE) | Di (ON-AXIS SURFACE SPACING) | Nej (REFRACTIVE INDEX) | $\nu dj$ (ABBE NUMBER) |
| 1 (SUBJECT SURFACE) | ∞ | 0.00 | | |
| 2 | ∞ | 2.80 | 1.52458 | 59.6 |
| 3 | ∞ | 244.17 | | |
| G1  4 | 10.513 | 3.08 | 1.61520 | 58.7 |
| 5 | 56.762 | 0.41 | | |
| 6 | −65.647 | 2.00 | 1.70557 | 41.2 |
| 7 | 11.332 | 1.04 | | |
| 8 (APERTURE DIAPHRAGM) | — | 0.20 | | |
| G2  9 | ∞ | 1.00 | 1.51169 | 56.7 |
| 10 (DIFFRACTION SURFACE) | ∞ | 0.20 | | |
| G3  11 | 28.443 | 4.96 | 1.83945 | 42.7 |
| 12 | −9.946 | 0.21 | | |
| 13 | −8.983 | 4.50 | 1.60718 | 38.0 |
| 14 | 135.629 | 34.30 | | |
| 15 | ∞ | 0.70 | 1.51872 | 64.2 |
| 16 | ∞ | 0.50 | | |
| 17 (LIGHT RECEIVING SURFACE) | ∞ | 0.00 | | |

FIG. 14B

| EXAPLE 6: PHASE DIFFERENCE FUNCTION COEFFICIENT | |
|---|---|
| C1 | −3.52224E+00 |
| C2 | 1.53843E−01 |
| C3 | −2.43858E−02 |
| C4 | 3.33565E−03 |
| C5 | −2.35368E−04 |

FIG. 15A

| EXAPLE 7: LENS DATA | | | | |
|---|---|---|---|---|
| Si (SURFACE NUMBER) | Ri (RADIUS OF CURVATURE) | Di (ON-AXIS SURFACE SPACING) | Nej (REFRACTIVE INDEX) | νdj (ABBE NUMBER) |
| 1 (SUBJECT SURFACE) | ∞ | 0.00 | | |
| 2 | ∞ | 2.80 | 1.52458 | 59.6 |
| 3 | ∞ | 241.92 | | |
| 4 (G1) | 11.594 | 6.76 | 1.48915 | 70.2 |
| 5 (G1) | 18.224 | 0.63 | | |
| 6 (G1) | -30.893 | 1.70 | 1.65222 | 33.8 |
| 7 (G1) | 36.762 | 0.25 | | |
| 8 (APERTURE DIAPHRAGM) | — | 0.20 | | |
| 9 (G2) | 118.037 | 1.00 | 1.51169 | 56.7 |
| 10 (DIFFRACTION SURFACE) (G2) | ∞ | 0.93 | | |
| 11 (G3) | 34.333 | 4.35 | 1.88815 | 40.8 |
| 12 (G3) | -10.027 | 0.21 | | |
| 13 (G3) | -8.715 | 2.00 | 1.67402 | 39.3 |
| 14 (G3) | 5682.822 | 36.13 | | |
| 15 | ∞ | 0.70 | 1.51872 | 64.2 |
| 16 | ∞ | 0.50 | | |
| 17 (LIGHT RECEIVING SURFACE) | ∞ | 0.00 | | |

FIG. 15B

| EXAPLE 7: PHASE DIFFERENCE FUNCTION COEFFICIENT | |
|---|---|
| C1 | -6.17892E+00 |
| C2 | 2.53173E-01 |
| C3 | -1.91653E-02 |
| C4 | 1.97065E-03 |
| C5 | -1.88146E-04 |

FIG. 17

VALUES IN CONDITIONAL EXPRESSION

| | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| REAL Fno. | 7.2 | 7.5 | 7.1 | 7.1 | 7.1 | 7.3 | 7.3 |
| HALF ANGLE OF VIEW ω | 23.1 | 23.4 | 23.2 | 23.1 | 23.1 | 23.2 | 23.2 |
| FOCAL LENGTH fa | 39.3277 | 39.5174 | 39.345 | 39.36443 | 39.2806 | 39.2847 | 40.381 |
| φall | 0.02543 | 0.02531 | 0.02542 | 0.025404 | 0.02546 | 0.02546 | 0.0248 |
| φdoe | 0.00093 | 0.00093 | 0.00181 | 0.002085 | 0.00136 | 0.00061 | 0.00107 |
| N | 9 | 8 | 18 | 20 | 13 | 6 | 9 |
| L | 6.48 | 6.43 | 6.58 | 6.5 | 6.48 | 6.48 | 6.5 |
| EXPRESSION (1) vp1 | 63.4 | 63.4 | 52.3 | 64.1 | 58.5 | 58.7 | 70.2 |
| EXPRESSION (2) Np3 | 1.83932 | 1.80922 | 1.88815 | 1.83932 | 1.90425 | 1.83945 | 1.88815 |
| EXPRESSION (3) vp3 | 37.2 | 39.6 | 40.8 | 37.2 | 34.0 | 42.7 | 40.8 |
| EXPRESSION (4) φdoe / φall | 0.0366 | 0.0367 | 0.0712 | 0.0821 | 0.0535 | 0.02405 | 0.043 |
| EXPRESSION (5) N/L | 1.389 | 1.244 | 2.736 | 3.077 | 2.006 | 0.926 | 1.385 |
| EXPRESSION (6) Np1 | 1.62003 | 1.62003 | 1.75844 | 1.51825 | 1.65425 | 1.62003 | 1.48915 |

EXAMPLE 1
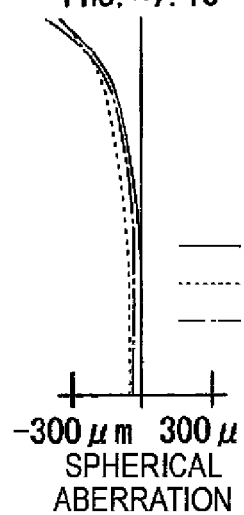
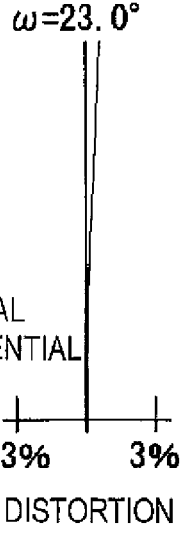
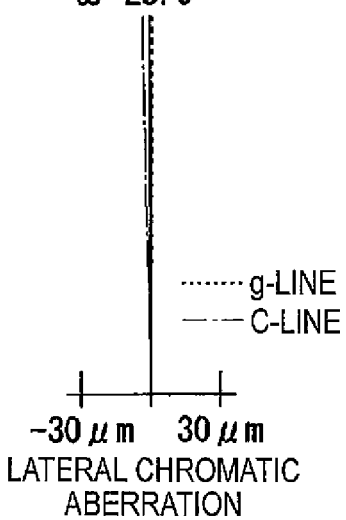
FIG. 18A   FIG. 18B   FIG. 18C   FIG. 18D
EXAMPLE 2
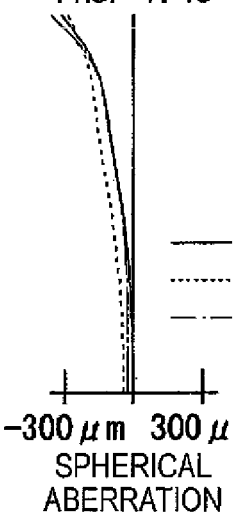
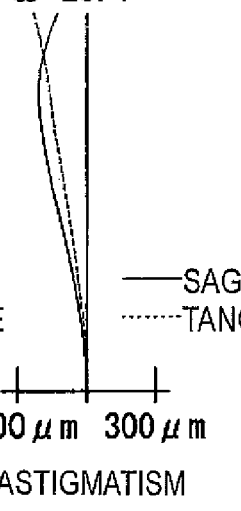
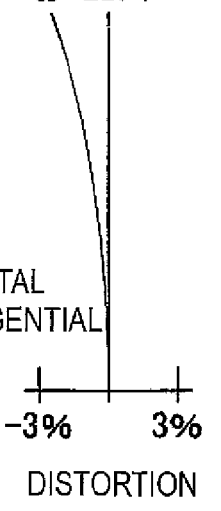
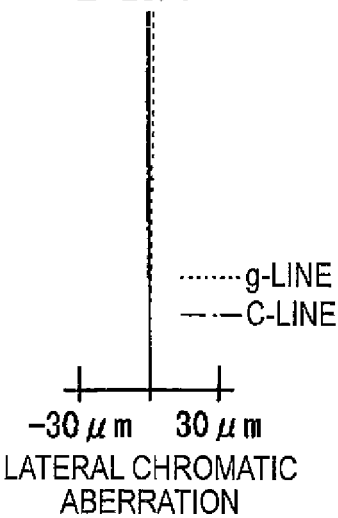
FIG. 19A   FIG. 19B   FIG. 19C   FIG. 19D EXAMPLE 1
FIG. 25A TANGENTIAL
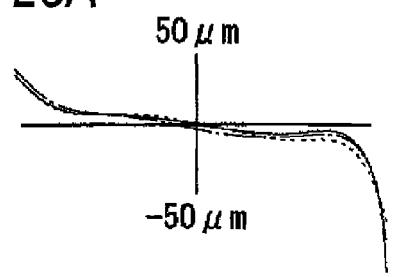
ω=23°
FIG. 25D SAGITAL
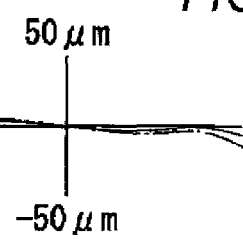
FIG. 25B
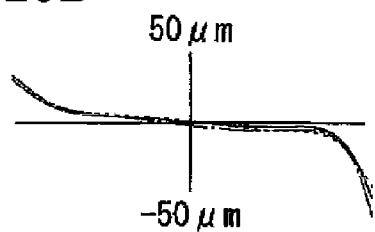
ω=16.6°
FIG. 25E
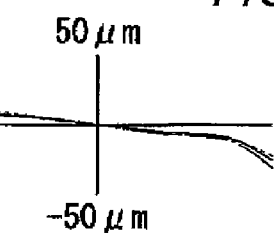
FIG. 25C
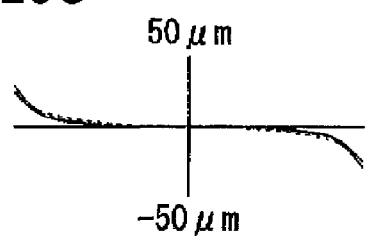
ω=0°
——— e-LINE
········ g-LINE
—·— C-LINE EXAMPLE 2
FIG. 26A TANGENTIAL
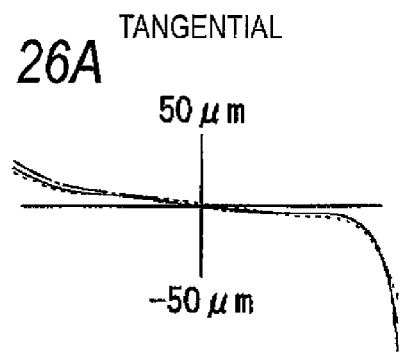
ω=23.4°
FIG. 26D SAGITAL
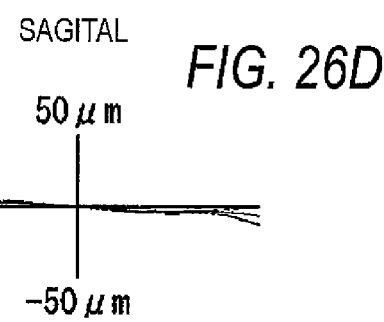
FIG. 26B
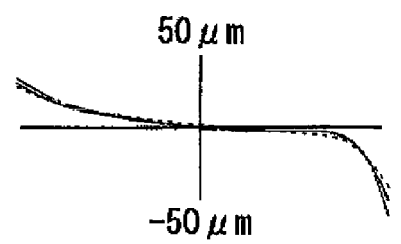
ω=16.9°
FIG. 26E
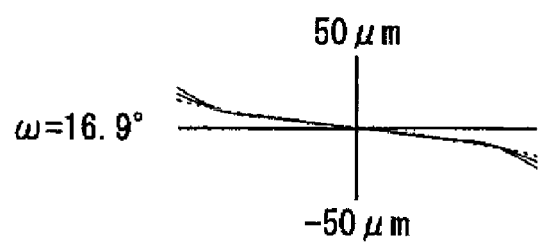
FIG. 26C
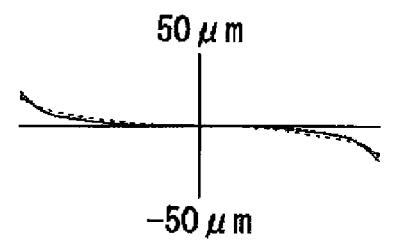
ω=0°
——— e-LINE
········· g-LINE
—·— C-LINE EXAMPLE 3
FIG. 27A TANGENTIAL
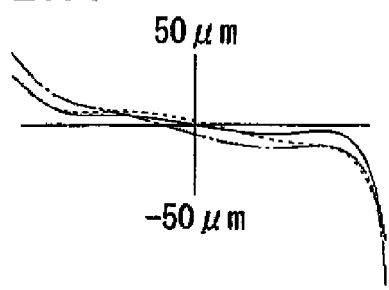
ω=23.2°
FIG. 27D SAGITAL
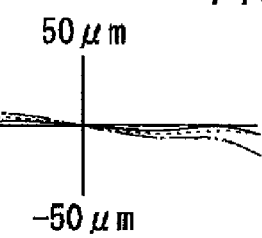
FIG. 27B
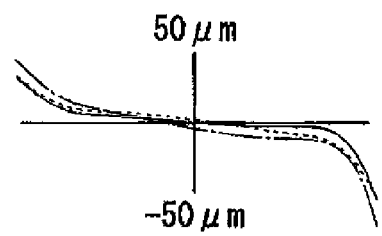
ω=16.7°
FIG. 27E
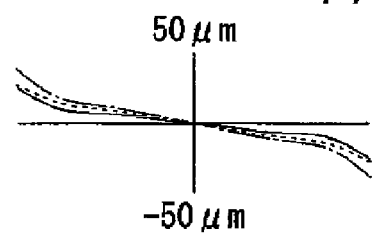
FIG. 27C
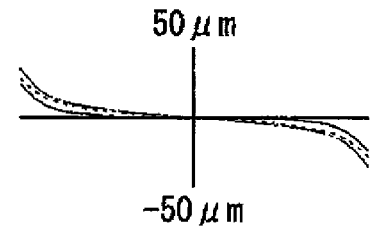
ω=0°
——— e-LINE
······· g-LINE
—·— C-LINE EXAMPLE 4
FIG. 28A TANGENTIAL
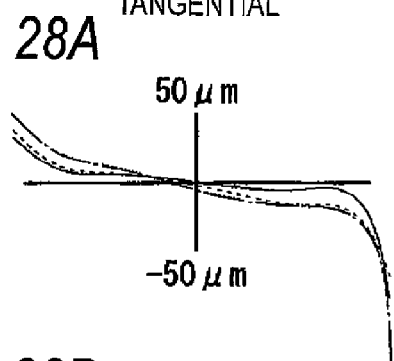
FIG. 28D SAGITAL
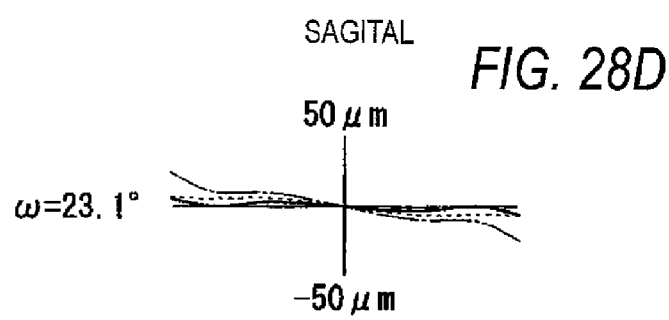
ω=23.1°
FIG. 28B
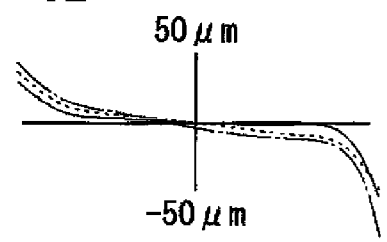
FIG. 28E
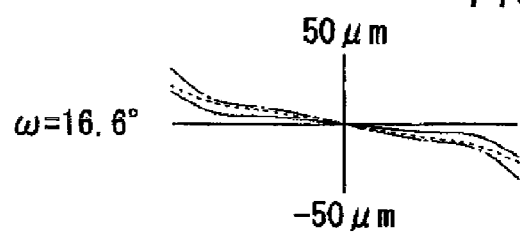
ω=16.6°
FIG. 28C
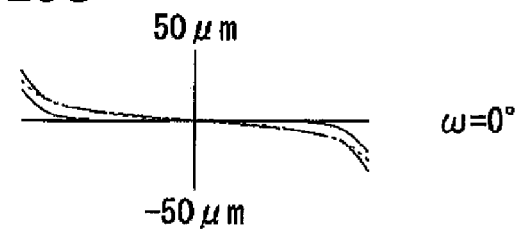
ω=0°
— e-LINE
······ g-LINE
—·— C-LINE EXAMPLE 5
FIG. 29A TANGENTIAL
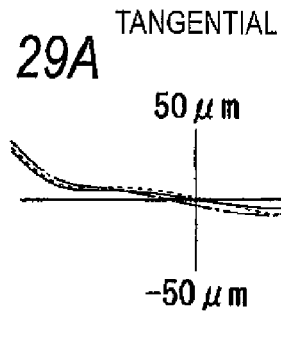
ω=23.1°
FIG. 29D SAGITAL
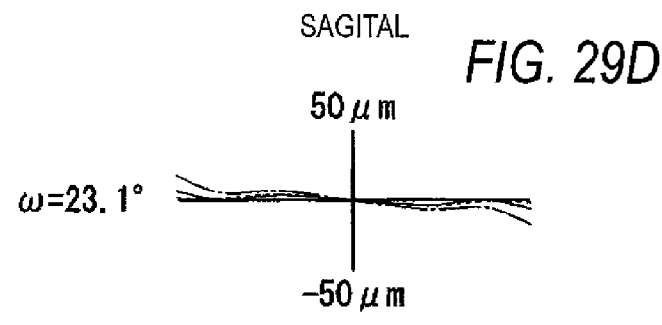
FIG. 29B
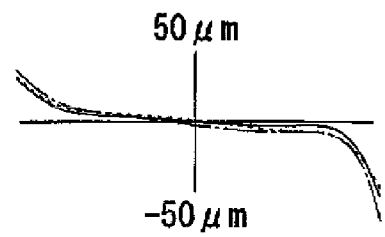
ω=16.7°
FIG. 29E
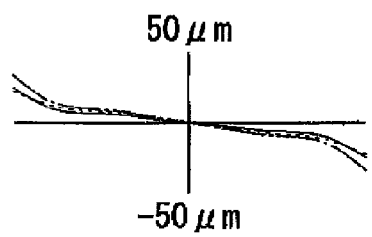
FIG. 29C
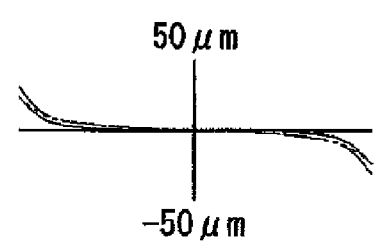
ω=0°
——— e-LINE
········ g-LINE
—·— C-LINE EXAMPLE 6
FIG. 30A TANGENTIAL
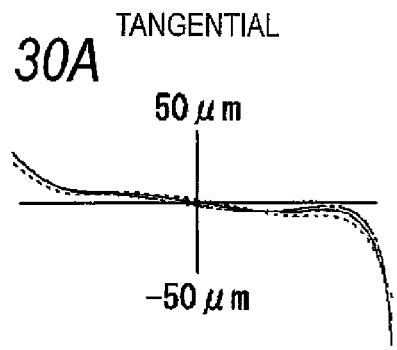
$\omega=23.2°$
FIG. 30D SAGITAL
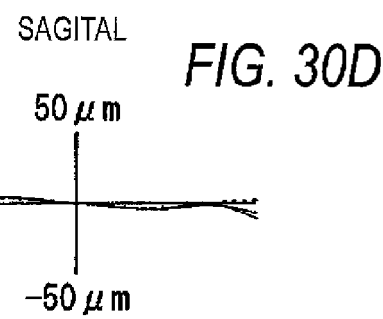
FIG. 30B
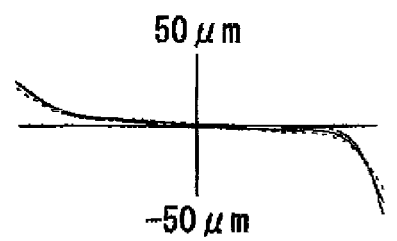
$\omega=16.7°$
FIG. 30E
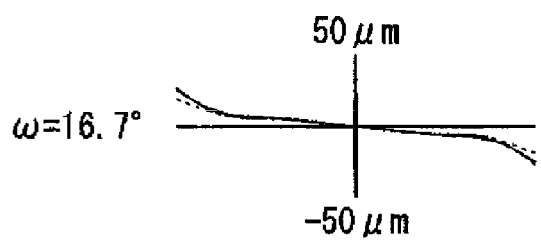
FIG. 30C
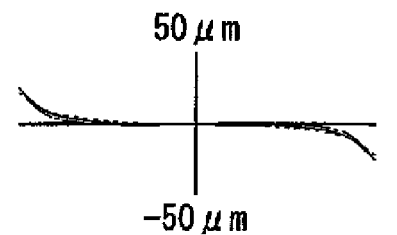
$\omega=0°$
—— e-LINE
------ g-LINE
—·— C-LINE EXAMPLE 7
FIG. 31A TANGENTIAL
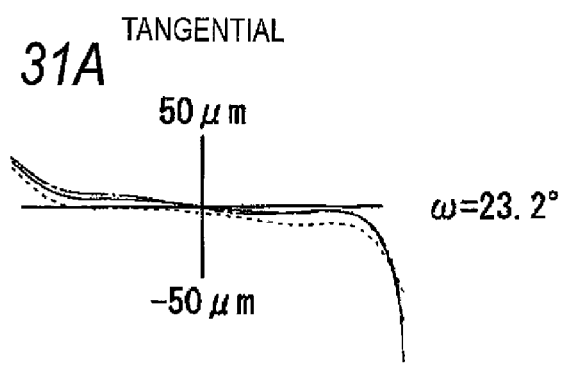
ω=23.2°
FIG. 31D SAGITAL
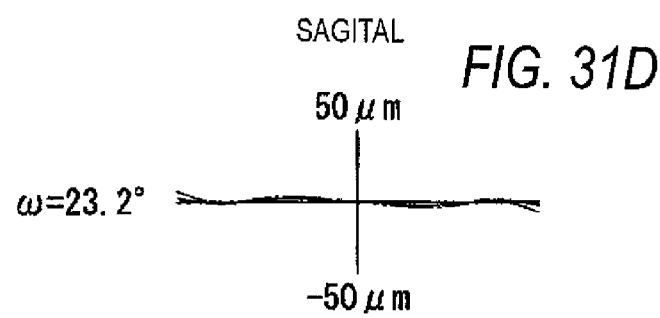
FIG. 31B
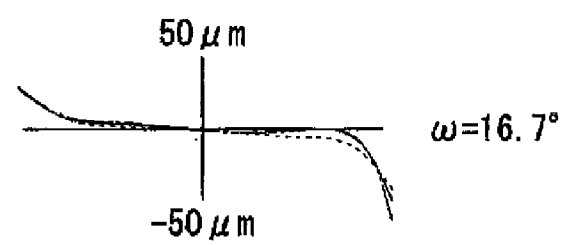
ω=16.7°
FIG. 31E
FIG. 31C
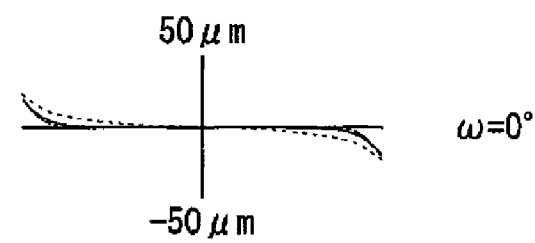
ω=0°
——— e-LINE
········ g-LINE
—·— C-LINE

COLOR IMAGE READOUT LENS AND COLOR IMAGE READOUT APPARATUS

BACKGROUND OF THE INVENTION

1. Field of the Invention

The present invention relates to a color image readout apparatus that is applicable to an apparatus such as a copying machine, an image scanner, or a film scanner for reading out a color manuscript or a color image by using a solid image pickup device such as a CCD (a Charge Coupled Device), and to a color image readout lens used therein.

2. Description of the Related Art

A color image read-out lens used for copying machines and various type scanners is preferred to well correct various aberrations without light vignetting in the range from the center of the lens to the peripheral portion thereof, and to have uniformly high resolving power in an overall image height. Particularly, to obtain high resolution, it is important to precisely correct lateral chromatic aberration and longitudinal chromatic aberration so as to remove magnification difference in image formation and contrast difference in resolution for each of colors of B (blue), G (green), and R (red). In correction of the longitudinal chromatic aberration, a normal achromatic lens can bring specified two wavelengths into focus at the same point with respect to primary spectrum, but in the other wavelengths, chromatic aberration remains as secondary spectrum. Accordingly, contrast difference in resolution depending on wavelengths occurs, and thus high resolution is not obtained in the whole range of BGR. By using an anomalous dispersion glass, the secondary spectrum can be corrected, but these kinds of glass usually have high material cost, or are usually disadvantageous in cost in that a processing for the glass is difficult. Thus, in order to completely correct aberrations with high accuracy, a method of increasing the number of lenses is required.

Recently, in general, there is known an example of using a diffractive optical element (DOE) in an optical system as means for correcting chromatic aberration by diffraction effect. FIGS. 32 and 33 illustrate exemplary configurations of kinoform type diffractive optical elements, as examples of diffractive optical elements. The diffractive optical element diffracts rays passing therethrough by forming a plurality of saw-like steps concentrically on a surface of a substrate 101. In the diffractive optical element, a plurality of orbicular zones 102 is formed in a front view as shown in FIG. 33. In the front view, most part of the orbicular zones 102 except for a center circular region 103 is diffractive.

Contrary to general lens materials, such a diffractive optical element has a negative Abbe number and large dispersion. Hence, it is possible to excellently correct chromatic aberration by appropriately combining the diffractive optical element with a normal refractive lens system (a lens system that does not use a diffractive optical element). Known lens systems using a diffractive optical element is disclosed in JP-A-10-311946, JP-A-10-339843, JP-2000-66093 and JP-2007-94278.

However, in the lens system described in JP-A-10-311946 and JP-2007-94278, the diffractive structure is formed on a surface having a large curvature. Hence, as compared with a case where the diffractive structure is formed on a flat surface, an effect of a shape error of the structure such as axial deviation between a vertical direction and an optical axis of the surface and astigmatism of XY directions orthogonal to an optical axis increases. Therefore, it is possible to expect deterioration in resolving power of the lens system. Hence, high accuracy is required to mold the lens system. In addition, in another case, any one of a surface serving as a substrate and a surface opposite thereto is formed as an aspheric surface. Hence, as compared with a case where the diffractive structure is formed on a flat surface or a spherical surface, an effect of a shape error in a manufacturing process such as axial deviation between a vertical direction and an optical axis of the surface, astigmatism of XY directions, and additionally an aspheric surface shape error (a surface undulation) in the optical axis direction greatly increases. Therefore, it is possible to expect further deterioration in resolving power of the lens system. In addition, the lens system described in JP-A-10-339843 includes many lenses, and thus has high price and is insufficient in miniaturization. In addition, in JP-2000-66093, there is an example in which a diffractive structure is formed on a flat substrate, but the substrate has too many orbicular zones of the diffractive structure. Hence, there is a great effect of a processing error, and it is difficult to form a desired shape with high accuracy. In addition, since a space of an aperture diaphragm is too wide, a decrease in size is not achieved.

SUMMARY OF THE INVENTION

The invention has been made in consideration of the problems mentioned above, and its object is to provide a high-resolution/high-performance color image readout lens which has a simple configuration and in which chromatic aberration is corrected with high accuracy and a color image readout apparatus capable of reading out an image having high resolution by using the high-resolution/high-performance color image readout lens.

In the color image readout lens according to the invention, there are arranged, in order from an object side: a first group comprising a positive lens convex toward the object side and a biconcave negative lens; a stop that is an aperture diaphragm; a second group comprising one diffractive optical element that has at least one flat surface and has a diffractive structure formed on the flat surface; and a third group comprising a biconvex positive lens and a negative lens concave toward the object side.

In the color image readout lens according to the invention, the diffractive optical element (the second group) and a normal refractive lens system (the first group and the third group) are appropriately combined with each other. Thus, a high-resolution/high-performance color image readout lens which has a simple configuration and in which chromatic aberration is corrected with high accuracy is obtained. In the color image readout lens according to the invention, there are arranged, in order from the object side, the first group of the refractive lens system, the aperture diaphragm, the second group of the diffractive optical element, and the third group of the refractive lens system. Therefore, it is possible to dispose the diffractive optical element in the vicinity of the aperture diaphragm, and thus it is also possible to effectively correct an overall image height. In addition, it is possible to restrict an aperture diameter of the diffractive optical element itself to be small, and thus an error such as a shape distortion in a molding process is suppressed. In addition, in the refractive lens system, each of the groups is formed of a positive lens and a negative lens, and thereby it becomes easy to correct mainly lateral chromatic aberration and field curvature. In addition, the diffractive structure of the diffractive optical element is formed on the flat surface, and thus performance deterioration caused by manufacturing error is minimized. In addition, in the refractive lens system, a cemented lens serving as an achromatic lens is not used, and thus it is possible to provide a low-cost lens system.

In the color image readout lens according to the invention, the diffractive optical element in the second group may be configured to comprise: a substrate that is a plane parallel plate; and a diffractive structure formed on at least one surface of the substrate.

Alternatively, the diffractive optical element of the second group may be configured to comprise: a substrate having a curved surface and a flat surface opposite thereto; and a diffractive structure formed on the flat surface thereof. In this case, the configuration can be applied to the color image readout lens which is integrated with a light receiving surface by a holding member, and it is preferred that the curved surface have a curvature for suppressing difference between an imaging position varied with an optical focus shift caused by temperature variation and a light receiving surface position varied with mechanical expansion and contraction of the holding member caused by temperature variation, so as to suppress positional deviation of an imaging position and a light receiving surface position caused by temperature variation.

In addition, the 'curved surface' is defined as a surface of which curvature is not zero. In addition, the flat surface is defined as a surface of which curvature is zero.

In the color image readout lens according to the invention, by appropriately employing the following preferred configuration, it is possible to further improve optical performance and it is further advantageous to reduce the cost.

In the color image readout lens according to the invention, the color image readout lens satisfies the following conditional expression:

$$50 < vp1 \quad (1),$$

where $vp1$ is an Abbe number of the positive lens in the first group with respect to the d-line.

In addition, the color image readout lens satisfies the following conditional expressions:

$$1.75 < Np3 \quad (2), \text{ and}$$

$$32 < vp3 < 45 \quad (3),$$

where $Np3$ is a refractive index of the positive lens in the third group with respect to the e-line, and $vp3$ is an Abbe number of the positive lens in the third group with respect to the d-line.

In addition, it is preferred that the diffractive optical element in the second group be disposed closer to the aperture diaphragm St than any other optical elements.

In addition, it is preferred that the diffractive optical element in the second group have a diffractive structure formed on its surface opposite to the other surface facing to the aperture diaphragm.

In addition, it is preferred that a power of a diffraction surface of the diffractive optical element in the second group satisfy the following conditional expression:

$$0.02 < \phi doe/\phi all < 0.09 \quad (4),$$

where $\phi doe$ is a power of the diffraction surface, and is defined as $-\lambda \times C1/\pi$ when a second order coefficient of a phase difference function is represented by C1 and a wavelength of light is represented by $\lambda$, and $\phi all$ is a power of the color image readout lens, and is defined as $1/fa$ when a focal length of the color image readout lens is represented by $fa$.

In addition, it is preferred that the diffractive structure of the diffractive optical element in the second group comprises a plurality of orbicular zones, and satisfy the following conditional expression:

$$0.70 < N/L < 3.30 \quad (5),$$

where N is the number of the orbicular zones and L is an effective diameter of a surface having the diffractive structure.

In addition, it is preferred that all the lenses constituting the first group and the third group are spherical glass lenses. In addition, it is preferred that the diffractive optical element in the second group be made of plastic.

In the color image readout apparatus according to the invention, there are provided the color image readout lens according to the invention; and an image pickup device that outputs an imaging signal based on an optical image formed by the color image readout lens.

In the color image readout apparatus according to the invention, an image signal having high resolution is obtained on the basis of an optical image having high resolution taken by the color image readout lens according to the invention.

BRIEF DESCRIPTION OF THE DRAWINGS

FIG. 7 illustrates a seventh exemplary configuration of a color image readout lens according to an embodiment of the invention, and is a sectional view illustrating a lens corresponding to Example 7;

FIG. 8 is a sectional view illustrating an exemplary configuration of a color image readout apparatus using a color image readout lens according to an embodiment of the invention;

FIGS. 9A and 9B are diagrams showing lens data of the color image readout lens according to Example 1, where FIG. 9A shows basic lens data, and FIG. 9B shows data of a phase difference function coefficient;

FIGS. 10A and 10B are diagrams showing lens data of the color image readout lens according to Example 2, where FIG. 10A shows basic lens data, and FIG. 10B shows data of a phase difference function coefficient;

FIGS. 11A and 11B are diagrams showing lens data of the color image readout lens according to Example 3, where FIG. 11A shows basic lens data, and FIG. 11B shows data of a phase difference function coefficient;

FIGS. 12A and 12B are diagrams showing lens data of the color image readout lens according to Example 4, where FIG. 12A shows basic lens data, and FIG. 12B shows data of a phase difference function coefficient;

FIGS. 13A and 13B are diagrams showing lens data of the color image readout lens according to Example 5, where FIG. 13A shows basic lens data, and FIG. 13B shows data of a phase difference function coefficient;

FIGS. 14A and 14B are diagrams showing lens data of the color image readout lens according to Example 6, where FIG. 14A shows basic lens data, and FIG. 14B shows data of a phase difference function coefficient;

FIGS. 15A and 15B are diagrams showing lens data of the color image readout lens according to Example 7, where FIG. 15A shows basic lens data, and FIG. 15B shows data of a phase difference function coefficient;

FIG. 17 is a diagram showing values of the conditional expressions with respect to the examples;

FIGS. 18A to 18D are aberration diagrams showing various aberrations of the color image readout lens according to Example 1, where FIG. 18A shows spherical aberration, FIG. 18B shows astigmatism, FIG. 18C shows distortion, and FIG. 18D shows lateral chromatic aberration;

FIGS. 19 to 19D are aberration diagrams showing various aberrations of the color image readout lens according to Example 2, where FIG. 19A shows spherical aberration, FIG. 19B shows astigmatism, FIG. 19C shows distortion, and FIG. 19D shows lateral chromatic aberration;

FIG. 20A shows spherical aberration, FIG. 20B shows astigmatism, FIG. 20C shows distortion, and FIG. 20D shows lateral chromatic aberration;

FIG. 21A shows spherical aberration, FIG. 21B shows astigmatism, FIG. 21C shows distortion, and FIG. 21D shows lateral chromatic aberration;

FIG. 22A shows spherical aberration, FIG. 22B shows astigmatism, FIG. 22C shows distortion, and FIG. 22D shows lateral chromatic aberration;

FIG. 23A shows spherical aberration, FIG. 23B shows astigmatism, FIG. 23C shows distortion, and FIG. 23D shows lateral chromatic aberration;

FIG. 24A shows spherical aberration, FIG. 24B shows astigmatism, FIG. 24C shows distortion, and FIG. 24D shows lateral chromatic aberration;

FIGS. 25A to 25E are aberration diagrams showing transverse aberrations of the color image readout lens according to Example 1;

FIGS. 26A to 26E are aberration diagrams showing transverse aberrations of the color image readout lens according to Example 2;

FIGS. 27A to 27E are aberration diagrams showing transverse aberrations of the color image readout lens according to Example 3;

FIGS. 28A to 28E are aberration diagrams showing transverse aberrations of the color image readout lens according to Example 4;

FIGS. 29A to 29E are aberration diagrams showing transverse aberrations of the color image readout lens according to Example 5;

FIGS. 30A to 30E are aberration diagrams showing transverse aberrations of the color image readout lens according to Example 6;

FIGS. 31A to 31E are aberration diagrams showing transverse aberrations of the color image readout lens according to Example 7;

DETAILED DESCRIPTION OF THE INVENTION

Figure 1:
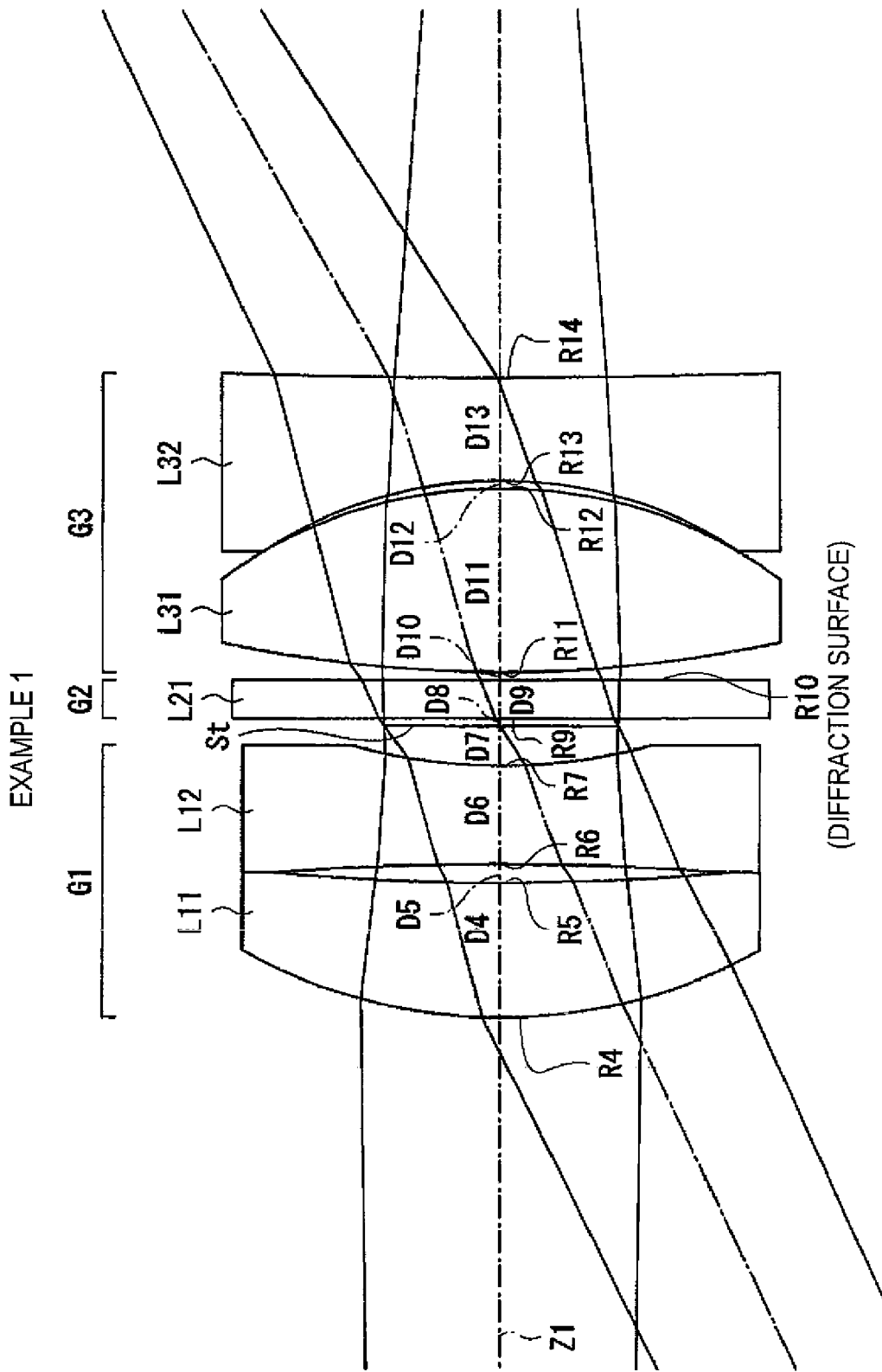
FIG. 1 illustrates a first exemplary configuration of a color image readout lens according to an embodiment of the invention, and is a sectional view illustrating a lens corresponding to Example 1.
Figure 2:
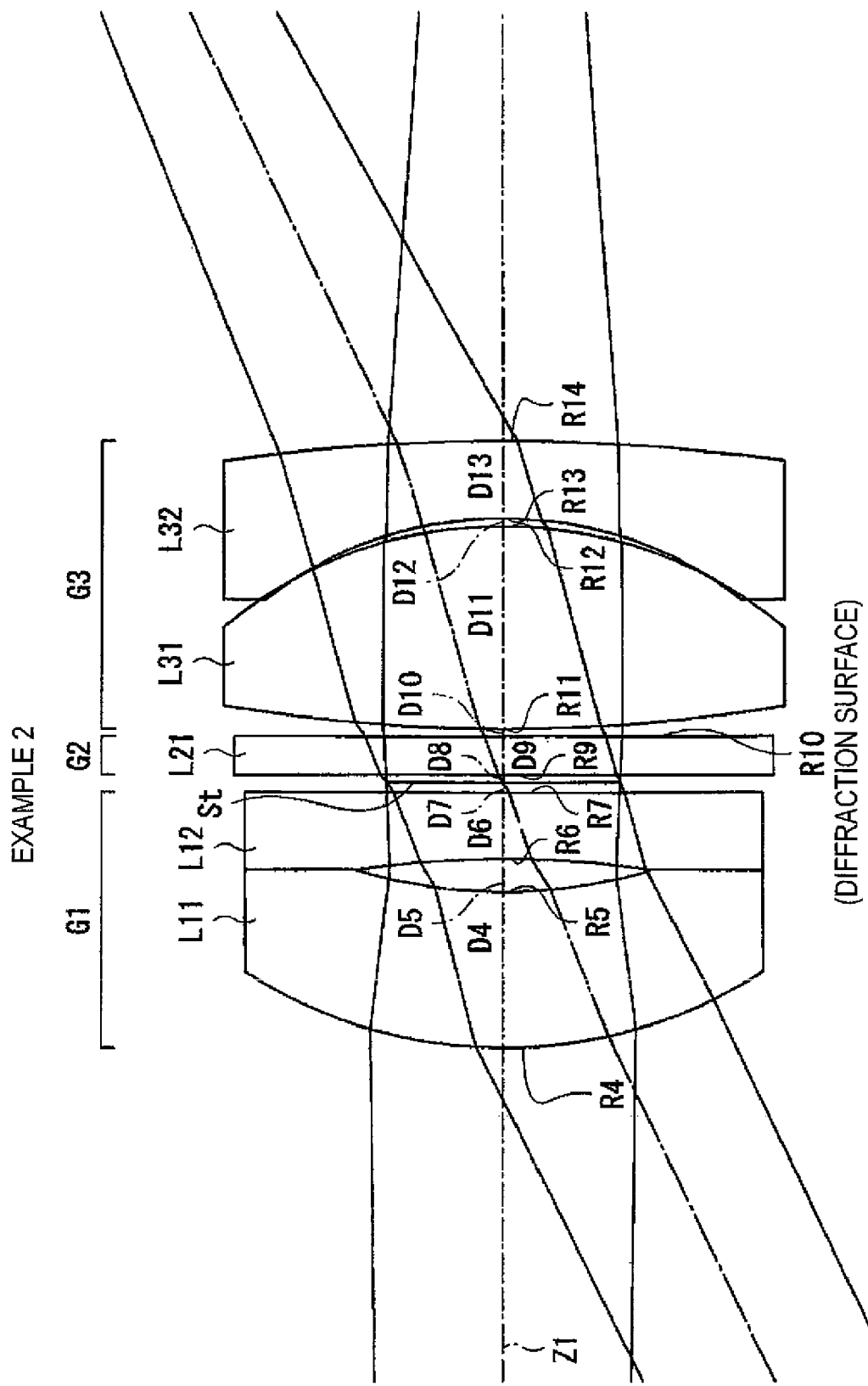
FIG. 2 illustrates a second exemplary configuration of a color image readout lens according to an embodiment of the invention, and is a sectional view illustrating a lens corresponding to Example 2.
Figure 3:
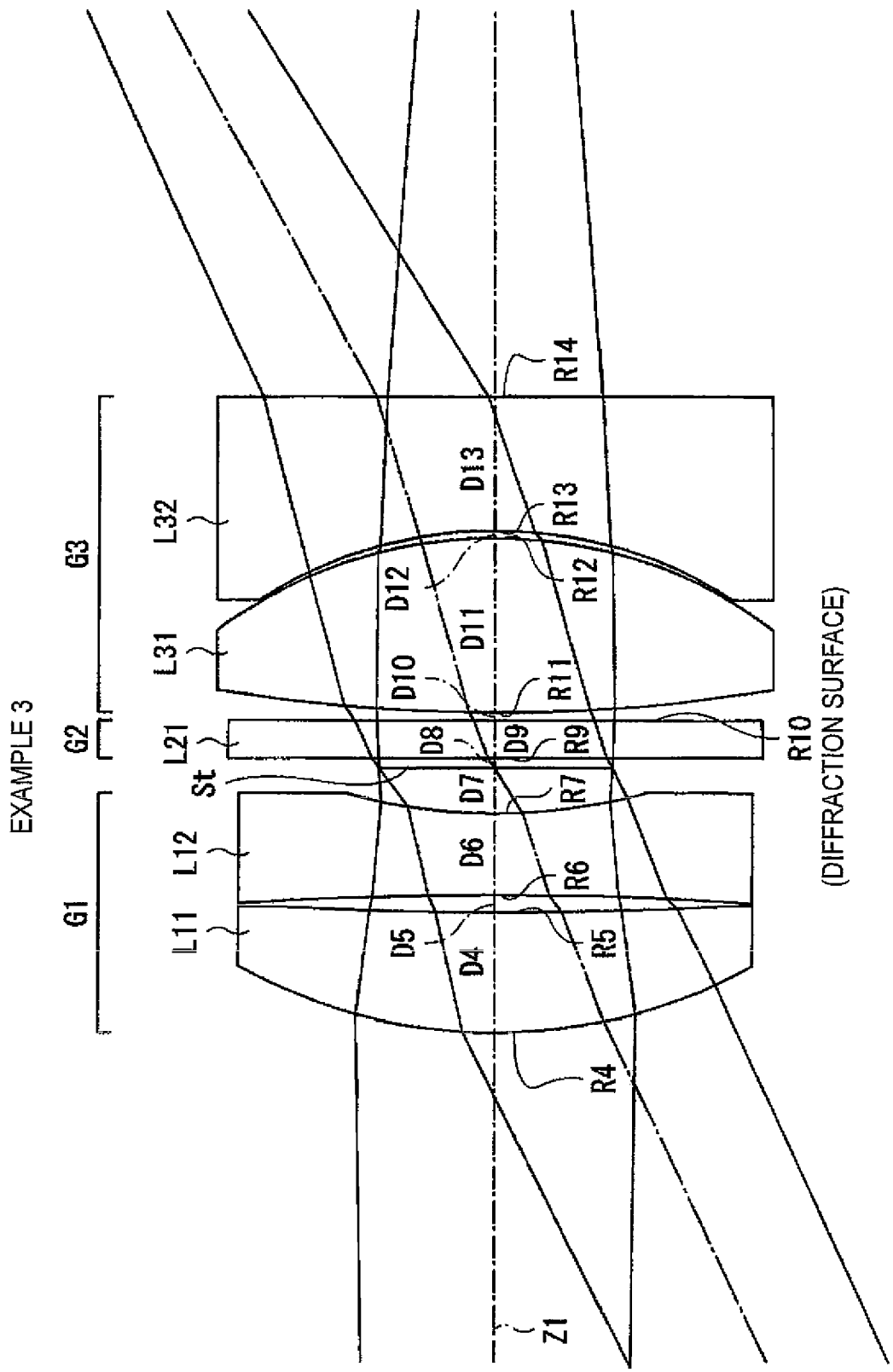
FIG. 3 illustrates a third exemplary configuration of a color image readout lens according to an embodiment of the invention, and is a sectional view illustrating a lens corresponding to Example 3.
Figure 4:
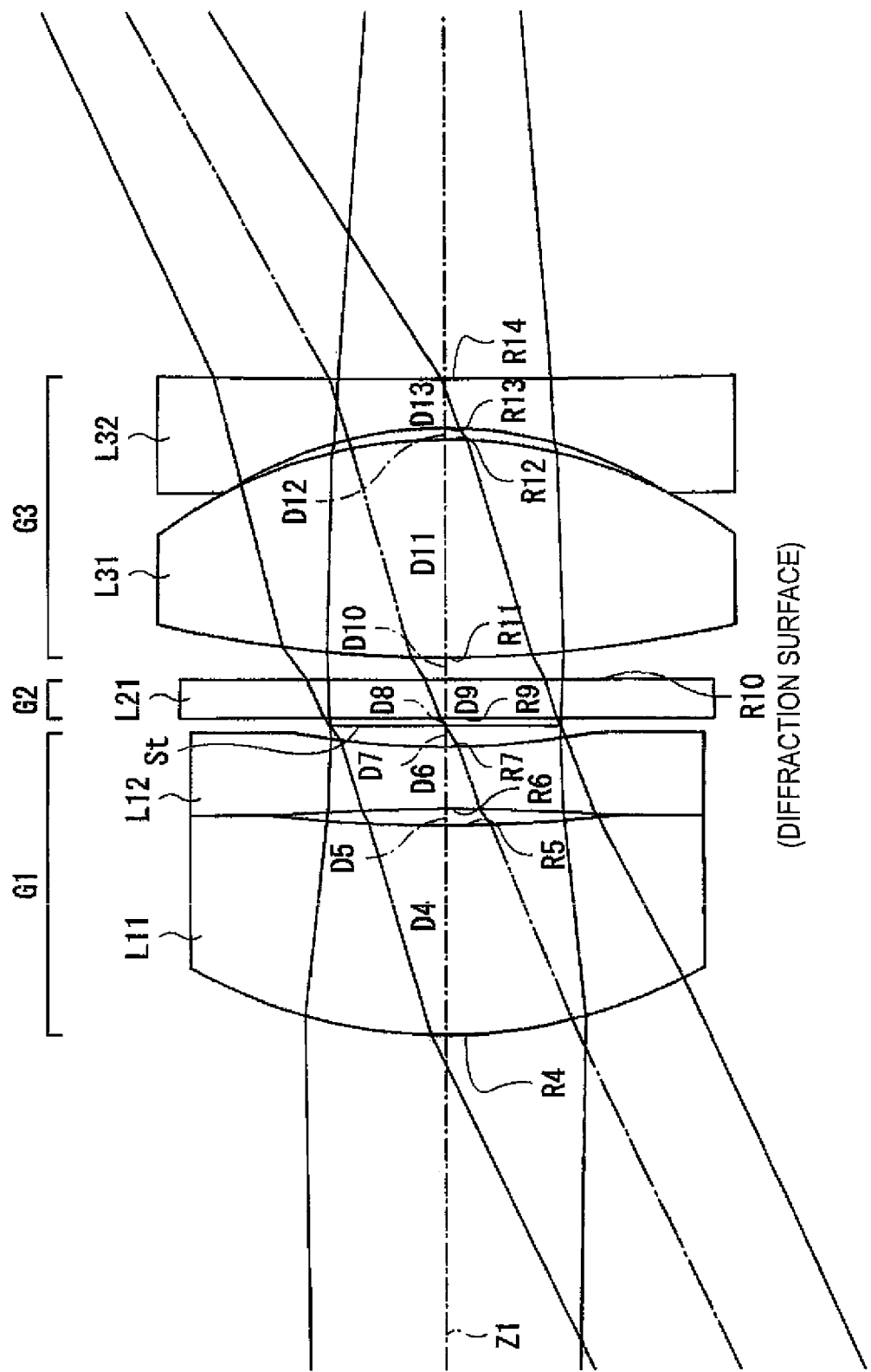
FIG. 4 illustrates a fourth exemplary configuration of a color image readout lens according to an embodiment of the invention, and is a sectional view illustrating a lens corresponding to Example 4.
Figure 5:
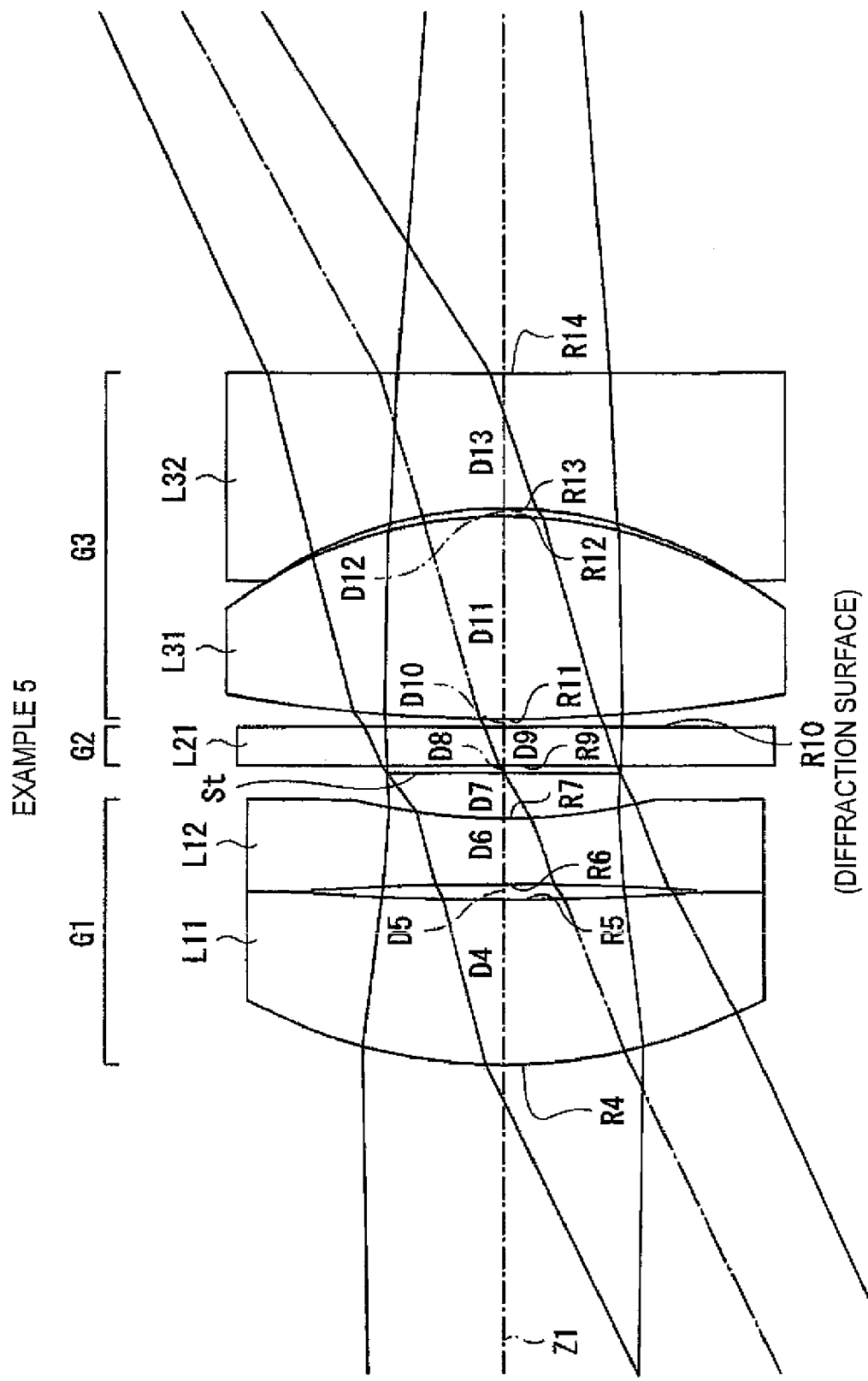
FIG. 5 illustrates a fifth exemplary configuration of a color image readout lens according to an embodiment of the invention, and is a sectional view illustrating a lens corresponding to Example 5.
Figure 6:
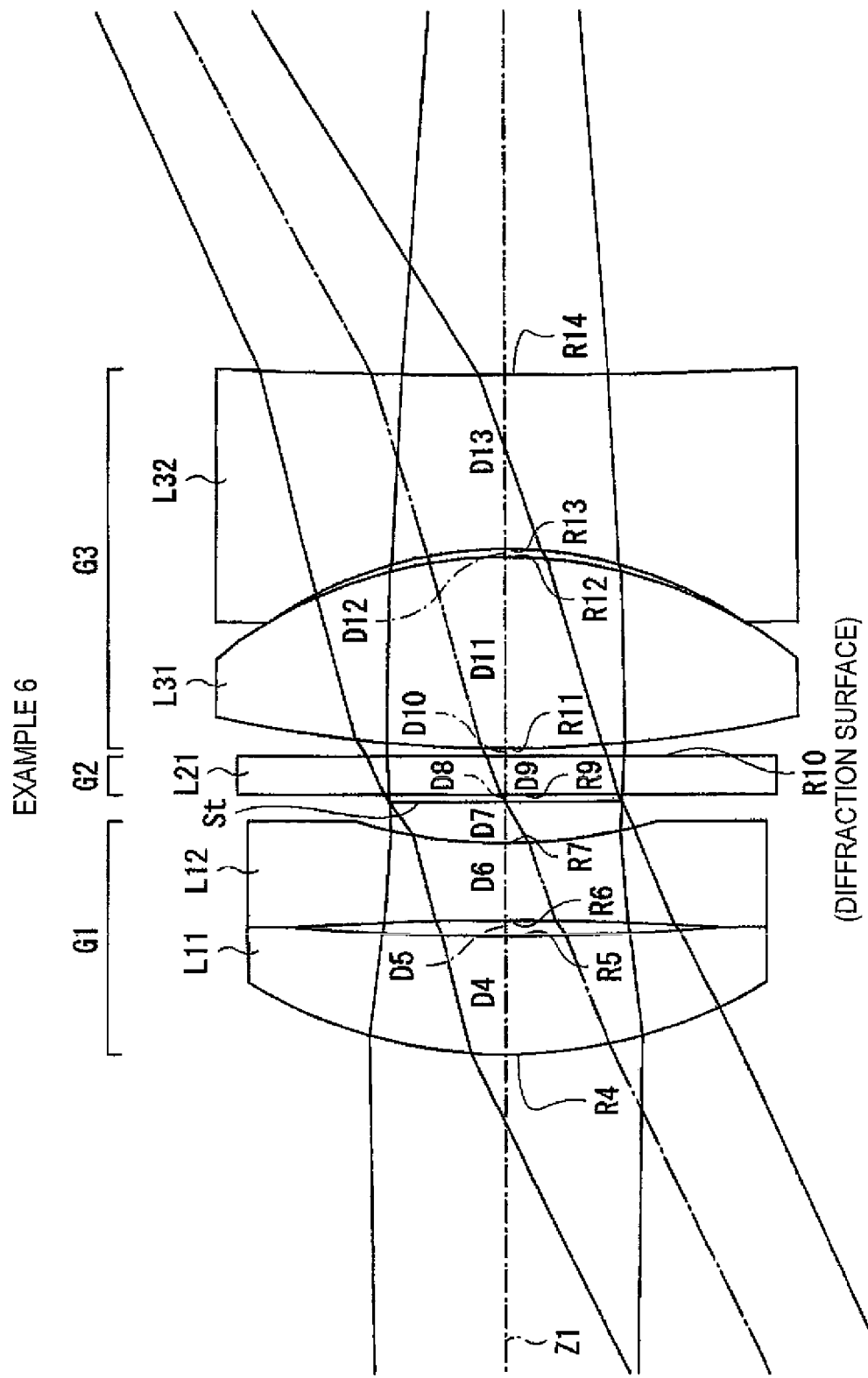
FIG. 6 illustrates a sixth exemplary configuration of a color image readout lens according to an embodiment of the invention, and is a sectional view illustrating a lens corresponding to Example 6.

Hereinafter, embodiments of the invention will be described in detail with reference to the drawings.

A color image readout lens according to the embodiment is applicable to an apparatus such as a copying machine, an image scanner, or a film scanner for reading out a color manuscript or a color image by using a solid image pickup device such as a CCD (a Charge Coupled Device), and to a color image readout lens used therein. The color image readout lens is employed as, for example, a color image readout lens 1 in a color image readout apparatus 10 shown in FIG. 8. The color image readout lens 1 is supported by a casing 5 in a state where the lens is held in a barrel 3. In the color image readout apparatus 10, a manuscript holder not shown in the drawing is disposed on the object side. A manuscript subjected to readout is placed on the manuscript holder. A manuscript surface (a subject surface) S1 is pressed by a holding glass 2. In addition, an image pickup device 6 such as CCD for taking an image of the manuscript is disposed on an image side. The front side of the image pickup device 6 is protected by a cover glass 4.

In the color image readout apparatus 10, illumination light is irradiated on the manuscript, and the catoptric light (reflection) from the manuscript is imaged on a light receiving surface S17 of the image pickup device 6 by the color image readout lens 1. The image pickup device 6 outputs an image signal based on the optical image. In addition, when the manuscript is a transparent manuscript such as a negative film or a positive film, illumination light is irradiated from the rear side of the manuscript holder toward the transparent manuscript. Then, the transmitted light is imaged on the light receiving surface S17 of the image pickup device 6 by the color image readout lens 1.

FIG. 1 illustrates a first exemplary configuration of the color image readout lens according to the embodiment. The exemplary configuration corresponds to a lens configuration of a first numerical example (FIGS. 9A and 9B) to be described later. Likewise, FIGS. 2 to 7 are sectional views illustrating second to seventh exemplary configurations corresponding to the lens configurations of second to seventh numerical examples to be described later. In addition, basic configurations of the exemplary configurations are all the same. Therefore, the first exemplary configuration shown in FIG. 1 will be described as a representative example in the following section.

In FIGS. 1 to 7, the reference sign Ri represents a radius of curvature of i-th surface, where the number i is the sequential number that sequentially increases as it gets closer to the light receiving surface S17 of the image pickup device 6 when the subject surface S1 shown in FIG. 8 is defined as a first surface. In addition, for convenience of explanation, as a form matching for examples to be described later, the holding glass 2 and the cover glass 4 in the color image readout apparatus 10 of FIG. 8 are also numbered as components, and thus the sequential number of lens surface closest to the object side in the color image readout lens is fourth. The reference sign Di represents an on-axis surface spacing between i-th surface and (i+1)th surface on an optical axis Z1.

In the color image readout lens, there are arranged, along the optical axis Z1 in order from the object side, a first group G1 formed of a positive lens L11 convex toward the object side and a biconcave negative lens L12, an aperture diaphragm St, a second group G2 formed of one diffractive optical element L21, and a third group G3 formed of a biconvex positive lens L31 and a negative lens L32 concave toward the object side.

It is preferred that the color image readout lens satisfy the following conditional expression:

$$50 < \nu p1 \quad (1),$$

where $\nu p1$ is an Abbe number of the positive lens L11 in the first group G1 with respect to the d-line.

In addition, it is preferred that the color image readout lens satisfy the following conditional expressions:

$$1.75 < Np3 \quad (2), \text{ and}$$

$$32 < \nu p3 < 45 \quad (3),$$

where Np3 is a refractive index of the positive lens L31 in the third group G3 with respect to the e-line, and $\nu p3$ is an Abbe number thereof with respect to the d-line.

In addition, it is preferred that all the lenses constituting the first group G1 and the third group G3 be formed as, for example, spherical glass lenses. In addition, it is preferred that the diffractive optical element L21 in the second group G2 is made of plastic.

In the color image readout lens, the diffractive optical element L21 in the second group G2 has at least one flat surface and has a diffractive structure formed on the flat surface. For example, the diffractive optical element L21 has a substrate serving as a plane parallel plate and has a diffractive structure formed on at least one surface thereof. Alternatively, the diffractive optical element L21 may be configured to have a substrate formed of a curved surface and a flat surface facing to the curved surface and have a diffractive structure formed on the flat surface. In this case, it is preferred that the curved surface have a predetermined curvature so as to suppress focal deviation caused by temperature variation. For example, in the color image readout apparatus 10 shown in FIG. 8, the color image readout lens 1 is integrated with the image pickup device 6 (the light receiving surface S17) by a holding member (the casing 5). In this case, it is preferred that the curved surface of the diffractive optical element L21 have a curvature for suppressing difference between an imaging position varied with an optical focus shift caused by temperature variation and a light receiving surface position varied with mechanical expansion and contraction of the holding member caused by temperature variation, thereby suppressing positional deviation of an imaging position and a light receiving surface position caused by temperature variation. In addition, the 'curved surface' is defined as a surface of which curvature is not zero. In addition, the flat surface is defined as a surface of which curvature is zero. In addition, in the seventh exemplary configuration shown in FIG. 7 of the exemplary configurations shown in FIGS. 1 to 7, one surface of the diffractive optical element L21 is formed as a curved surface.

In addition, it is preferred that the diffractive optical element L21 in the second group G2 be disposed closer to the aperture diaphragm St than any other optical elements. Specifically, it is preferred that the diffractive optical element L21 be disposed on a position closer to the aperture diaphragm St than a lens (the negative lens L12) closest to the image side in the first group G1. In addition, it is preferred that the diffractive optical element L21 have a diffractive structure formed on a surface thereof opposite to the other surface facing to the aperture diaphragm St.

It is preferred that a power of the diffraction surface of the diffractive optical element L21 satisfy the following conditional expression:

$$0.02 < \phi doe/\phi all < 0.09 \quad (4),$$

where $\phi doe$ is a power of the diffraction surface, and is defined as $-\lambda \times C1/\pi$ when a second order coefficient of a phase difference function is represented by C1 and a wavelength of light is represented by $\lambda$. In addition, $\phi all$ is a power of the color image readout lens, and is defined as 1/fa when a focal length of the color image readout lens is represented by fa.

Figure 32:
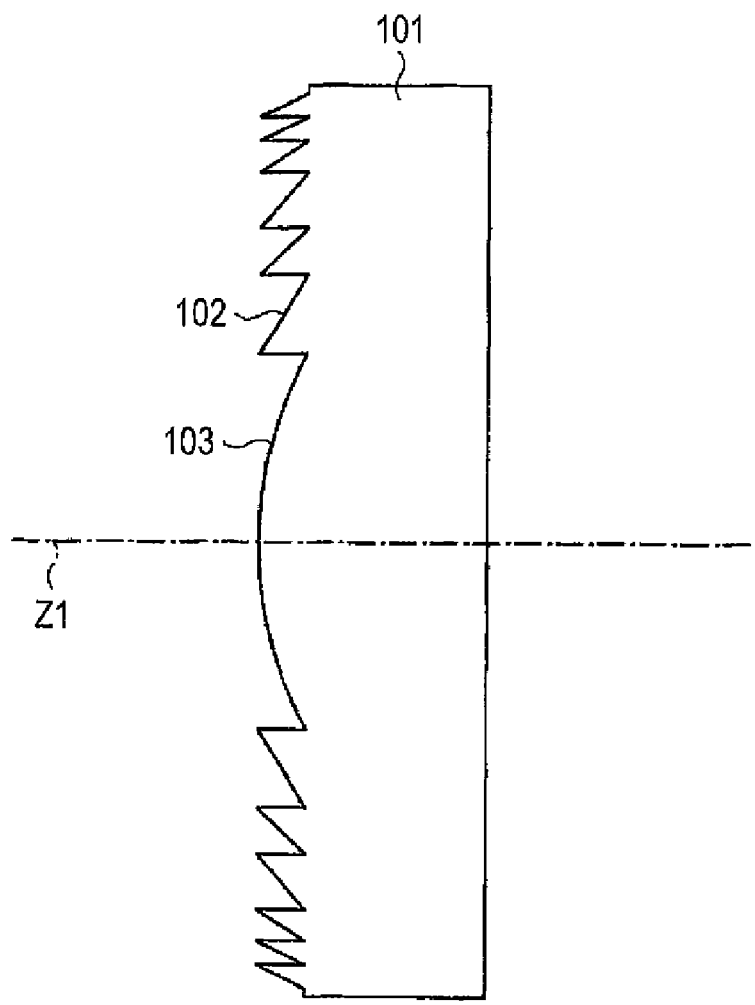
FIG. 32 is a sectional view illustrating an exemplary configuration of a diffractive optical element.
Figure 33:
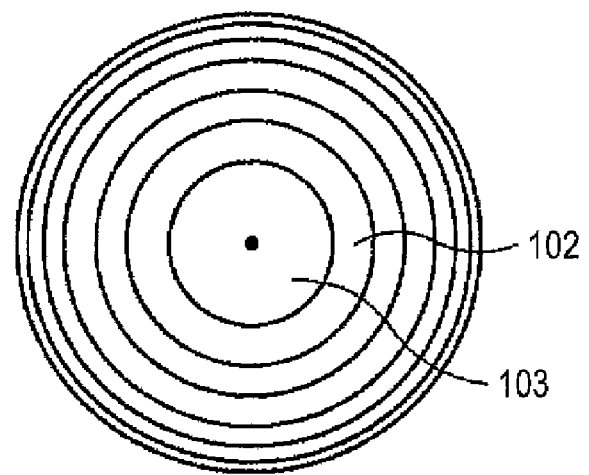
FIG. 33 is a front view illustrating an exemplary configuration of a diffractive optical element.

In addition, it is preferred that the diffractive structure of the diffractive optical element L21 be formed of a plurality of orbicular zones, and satisfy the following conditional expression:

$$0.70 < N/L < 3.30 \quad (5),$$

where N is the number of the orbicular zones and L is an effective diameter of the surface having the diffractive structure. In addition, in the number of the orbicular zones N, a center circular region 103 is not counted, for example, in a case of the diffractive structure shown in FIGS. 32 and 33.

Hereinafter, effects and advantages of the color image readout lens mentioned above will be described.

In the color image readout lens according to the invention, the diffractive optical element L21 in the second group G2 and a normal refractive lens system (the first group G1 and the third group G3) are appropriately combined with each other. Thus, a high-resolution/high-performance color image readout lens which has a simple configuration and in which chromatic aberration is corrected with high accuracy is obtained. In the color image readout lens according to the invention, there are arranged, in order from the object side, the first group G1 of the refractive lens system, the aperture diaphragm St, the second group G2 of the diffractive optical element L21, and the third group G3 of the refractive lens system. Therefore, it is possible to dispose the diffractive optical element L21 in the vicinity of the aperture diaphragm St, and thus it is also possible to effectively correct an overall image height. In addition, it is possible to restrict an aperture diameter of the diffractive optical element L21 itself to be small, and thus an error such as a shape distortion in a molding process is suppressed. In addition, the diffractive structure of the diffractive optical element t21 is formed on the flat surface, and thus performance deterioration caused by manufacturing error is minimized. In addition, in the refractive lens system, a cemented lens serving as an achromatic lens is not used, and thus it is possible to provide a low-cost lens system. In addition, the number of the orbicular zones of the diffractive structure is restricted, and thus it is possible to reduce influence of shape error on imaging performance. Therefore, it becomes easy to perform a shape processing.

In addition, in the refractive lens system, each group is formed of a positive lens and a negative lens, and thereby it becomes easy to correct mainly lateral chromatic aberration and field curvature. By using the diffractive optical element L21, excellent correction of chromatic aberration is possible, but it is difficult to correct completely the longitudinal chromatic aberration and the lateral chromatic aberration only by using the diffractive optical element L21. Hence, particularly, in order to finely adjust the lateral chromatic aberration and obtain high resolution, it is preferred that each group of the refractive lens system be formed of a low dispersion positive lens and a high dispersion negative lens.

The conditional expression (1) is for effectively correcting the lateral chromatic aberration and the field curvature in the first group G1. When the conditional expression (1) is not satisfied, it is required to employ a material having large dispersion and high refractive index in the negative lens L12 of the first group G1, and thus, positive field curvature increases. The positive lens L11 in the first group G1 preferably satisfies the following expression:

$$1.55 < Np1 \qquad (6),$$

where Np1 is a refractive index with respect to the e-line. By satisfying the conditional expression (6), it is possible to prevent high-order aberration of marginal rays caused by the increase in curvature.

The conditional expression (2) and conditional expression (3) is for well correcting the field curvature and the lateral chromatic aberration in the third group G3. By satisfying the conditional expression (2), it is possible to correct the field curvature with comparatively small curvature, and thus it is possible to prevent comatic flare as high order aberration in marginal rays. When the lower limit of the conditional expression (3) is exceeded, it is required to employ a material having extremely small dispersion in the negative lens L32, in order to well correct aberration. In addition, when the upper limit thereof is exceeded, it is required to employ a material having comparatively large dispersion in the negative lens L32. In any cases, it is hard to employ a material having a refractive index appropriate to correct mainly the lateral chromatic aberration and the field curvature in the negative lens L32, and thus it is difficult to correct those.

To correct the chromatic aberration, it is preferred that the diffractive optical element L21 be disposed closer to the aperture diaphragm than any other optical elements. By satisfying this, it is possible to reduce the secondary spectrum of the longitudinal chromatic aberration while keeping the lateral chromatic aberration small. It is preferred that the diffractive structure of the diffractive optical element L21 be disposed on a surface thereof opposite to the other surface adjacent to the aperture diaphragm. With such a configuration, it is possible to separate marginal rays for each image height, and thus it is possible to effectively correct the marginal rays.

The conditional expression (4) is regarding a power of diffractive structure, and it is preferred that the diffractive power is provided so as to satisfy the conditional expression. When the lower limit is exceeded, achromatic effect due to diffraction decreases, and thus correction of the chromatic aberration is insufficient. Conversely, when the upper limit is exceeded, correction of the chromatic aberration is in excess. Therefore, in any cases, a resolving power thereof deteriorates, and so the cases are not preferred.

It is preferred that the diffractive optical element L21 have an orbicular zone diffraction section provided thereon so as to satisfy the conditional expression (5). In the conditional expression (5), when the upper limit is exceeded by increasing the number of the orbicular zones N or decreasing the effective diameter L, pitches of peripheral portions of the orbicular zones decrease, and thus processing difficulty increases. When the lower limit of the conditional expression (5) is exceeded by decreasing the number of the orbicular zones N, pitches of the orbicular zones increase, it is difficult to effectively act an effect of the aberration correction due to diffraction of the diffractive optical element. When the lower limit of the conditional expression (5) is exceeded by increasing the effective diameter L, processing time increases, and it becomes easy to cause deterioration in processing accuracy. Thus, the cases mentioned above are not preferred.

The first group G1 and the third group G3 may be formed of glass lenses. The glass lens can employ various materials, and so is advantageous to finely adjust the lateral chromatic aberration. In addition, the glass lens can be polished, and so is advantageous to achieve low cost. It is preferred that the diffractive optical element L21 be made of plastic. Since plastic has high degree of freedom in forming, it becomes easy to perform processing of the diffractive optical element L21, and plastic has a low price. In addition, since the refractive index has high dependency on temperature, it is possible to correct the focal deviation caused by temperature variation with small curvature as compared with glass. Thus, it is possible to minimize aberration variation caused by temperature variation.

In addition, naturally, a lens, a lens barrel and, a casing for holding the lens, a manuscript, and a sensor are expandable and contractible depending on ambient temperature variation, and thus a lens has a temperature characteristic that a focal position for imaging a subject is deviated from the light receiving surface position, on which the subject should be essentially imaged, on the sensor. This characteristic has directly influence on deterioration in imaging performance. The focal deviation caused by the temperature characteristic can be corrected by the second group G2. In detail, a surface opposite to the other surface having the diffractive structure of the diffractive optical element L21 in the second group G2 has curvature capable of suppressing focus shift according to variation in curvature, refractive index, and size of the casing caused by temperature variation. A detailed example of this will be described later.

As described above, according to the color image readout lens of the embodiments, the diffractive optical element L21 (the second group G2) and the normal refractive lens system (the first group G1 and the third group G3) are appropriately combined with each other. Thus, it is possible to embody a high-resolution/high-performance color image readout lens which has a simple configuration and in which chromatic aberration is corrected with high accuracy. In addition, the color image readout lens of the invention is configured to output an imaging signal based on an optical image formed by the high-resolution/high-performance color image readout lens of the embodiments. Therefore, it is possible to read out an image having high resolution.

EXAMPLE

Next, specific numerical examples of the color image readout lens according to the embodiments will be described. Hereinafter, the first to seventh numerical examples will be described collectively. These examples show cases of applications of the color image readout lens 1 in the color image readout apparatus 10 shown in FIG. 8.

FIGS. 9A and 9B show specific lens data corresponding to the configuration of the color image readout lens shown in FIG. 1. Particularly, FIG. 9A shows the basic lens data, and FIG. 9B shows diffraction surface data. In the item of the surface number Si in the lens data shown in FIG. 9A, the number i represents the sequential number of i-th (i=1 to 17) surface that sequentially increases as it gets closer to the image side when a surface of a component closest to the object side is defined as a first surface, with regard to the color image readout lens according to Example 1. In addition, in this lens data, the second surface S2 and the third surface S3 are surfaces of the holding glass 2 in the color image readout apparatus 10 shown in FIG. 8, and the fifteenth surface S15 and sixteenth surface S16 are surfaces of the cover glass 4. In FIG. 9A, in the item of the radius of curvature Ri, there are shown values (mm) of the radius of curvature of i-th surface from the object side to correspond to the reference sign Ri in FIG. 1. Likewise, in the item of the on-axis surface spacing Di, there are shown spaces (mm) on the optical axis between the i-th surface Si and the (i+1)th surface Si+1 on the optical axis from the object side. In the item of Nej, there are shown values of the refractive index with respect to the e-line (wavelength 546.07 nm) of the j-th optical component from the object side. In the item of vdj, there are shown values of the Abbe number with respect to the d-line (587.6 nm) of the j-th optical component from the object side.

In the color image readout lens according to Example 1, the surface S10 opposite to the other surface adjacent to the aperture diaphragm St is formed as a diffraction surface, in the diffractive optical element L21 of the second group G2. The diffractive structure of the diffractive optical element L21 has a shape generating an optical path difference corresponding to a phase change amount $\phi$ of a wave surface obtained by optional distance r from the optical axis Z1. The phase change amount $\phi$ is calculated by the following phase difference function:

$$\phi(r) = C1 \cdot r^2 + C2 \cdot r^4 + C3 \cdot r^6 + C4 \cdot r^8 + C5 \cdot r^{10}.$$

In FIG. 9B, there are shown values of the 2i-th order coefficient Ci (i=1, 2, 3, 4, 5) in the phase difference function. In the numerical values, the reference sign "E" means that a numerical value following this is a power exponent having a base of 10 and that this numerical value having a base of 10 and expressed by an exponential function is multiplied by a numerical value before the "E". For example, it means that, for '1.0E-02', '$1.0 \times 10^{-2}$'.

Similarly to the color image readout lens according to Example 1 mentioned above, in FIGS. 10A and 10B to FIGS. 15A and 15B, there are shown, as Examples 2 to 7, specific lens data corresponding to the configuration of the color image readout lens shown in FIGS. 2 to 7.

In addition, in any one of the color image readout lens according to Examples 2 to 7, similarly to the color image readout lens according to Example 1, the surface S10 opposite to the other surface adjacent to the aperture diaphragm St is formed as a diffraction surface, in the diffractive optical element L21 of the second group G2.

Now, a detailed example of the correction for focal deviation caused by temperature variation will be described with reference to Examples 2 and 7.

The lens data in Examples 2 and 7 mentioned above is data measured at room temperature (for example, 20° C.). In Example 2, the surface opposite to the diffraction surface is a flat surface, and in Example 7, the surface opposite to the diffraction surface is a curved surface convex toward the object side. In addition, as shown in FIG. 8, it is considerable a model of a simple optical system in which the holding member (the casing 5) simply connects in the range from the lenses to the subject surface S1 and from the lenses to the light receiving surface S17. In addition, the linear expansion coefficient of the holding member is set by $600 \times 10^{-7}$.

Figure 16:
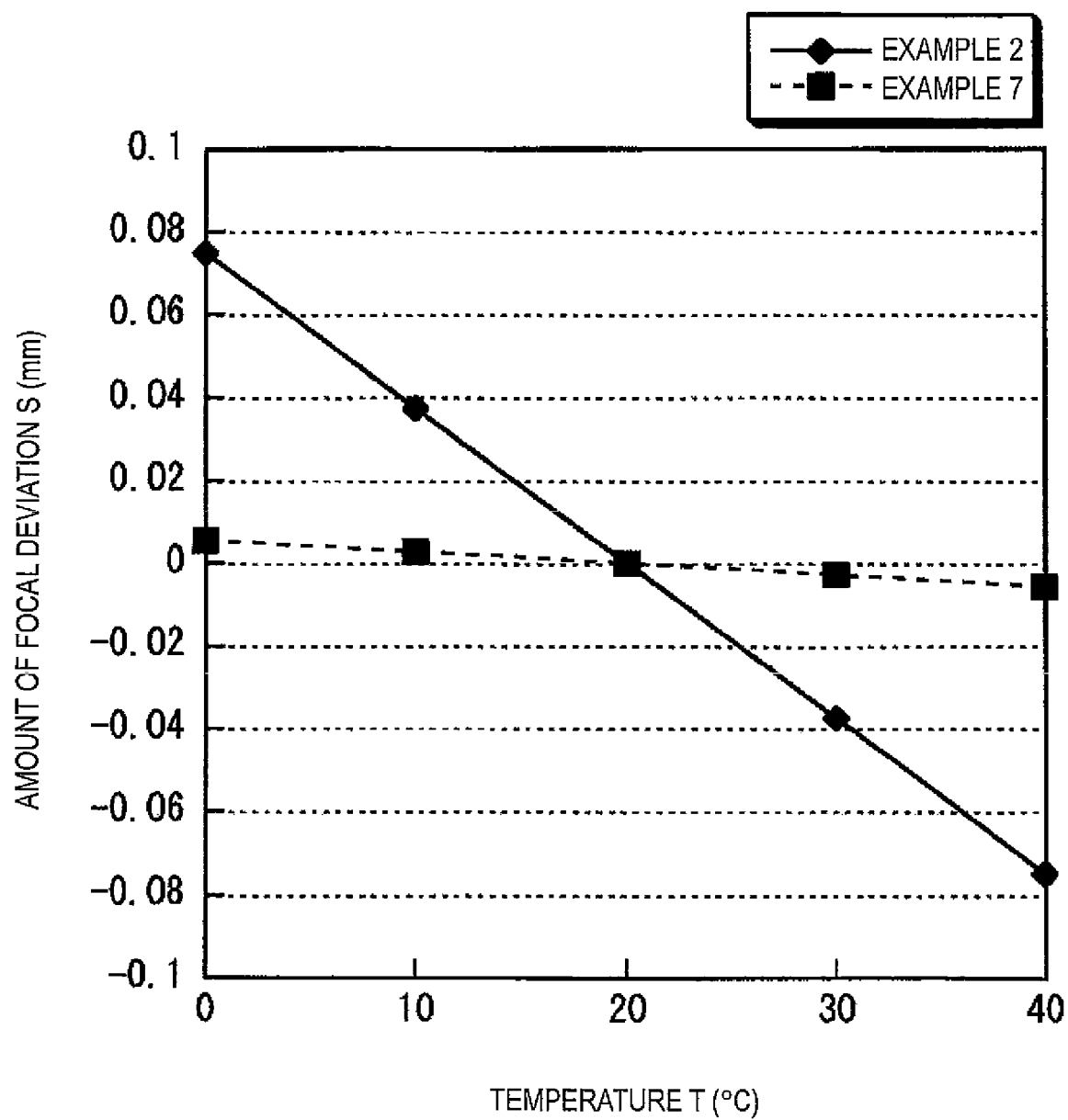
FIG. 16 is a characteristic diagram showing a focal deviation caused by temperature.
Figures 20A, 20B, 20C, 20D:
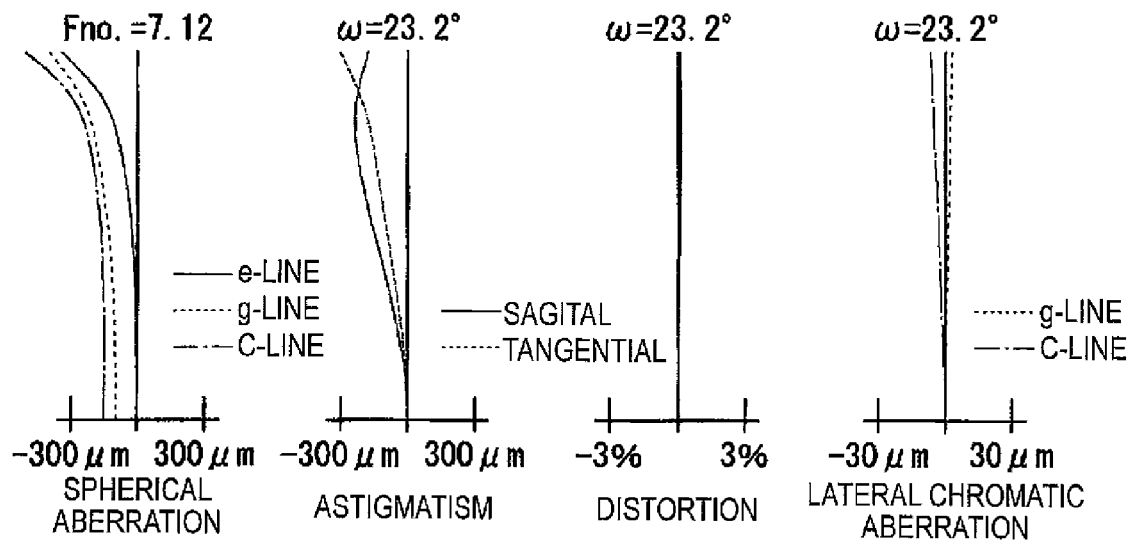
FIGS. 20A to 20D are aberration diagrams showing various aberrations of the color image readout lens according to Example 3, where
Figures 21A, 21B, 21C, 21D:
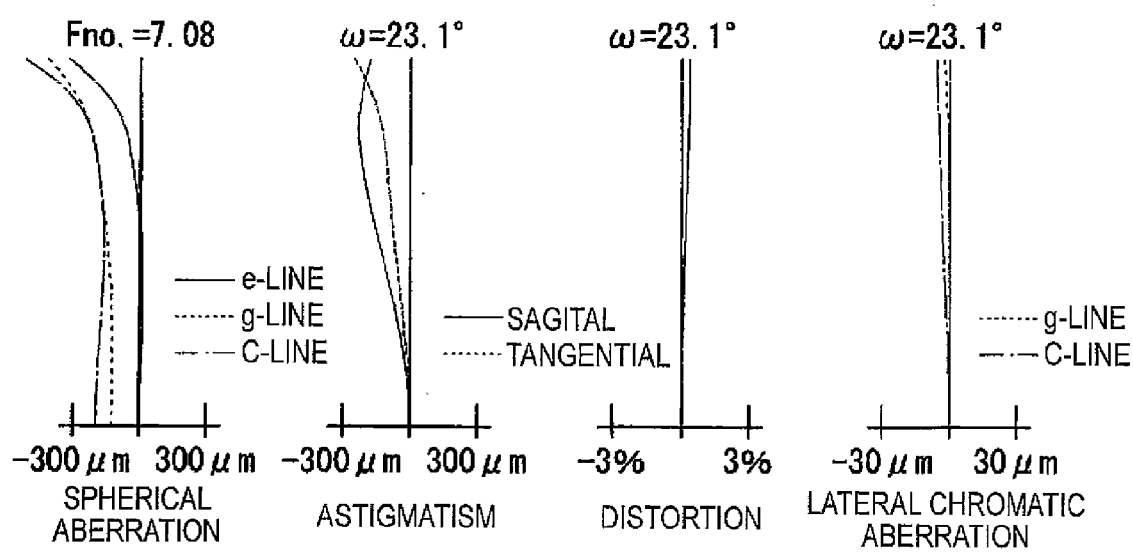
FIGS. 21A to 21D are aberration diagrams showing various aberrations of the color image readout lens according to Example 4, where
Figures 22A, 22B, 22C, 22D:
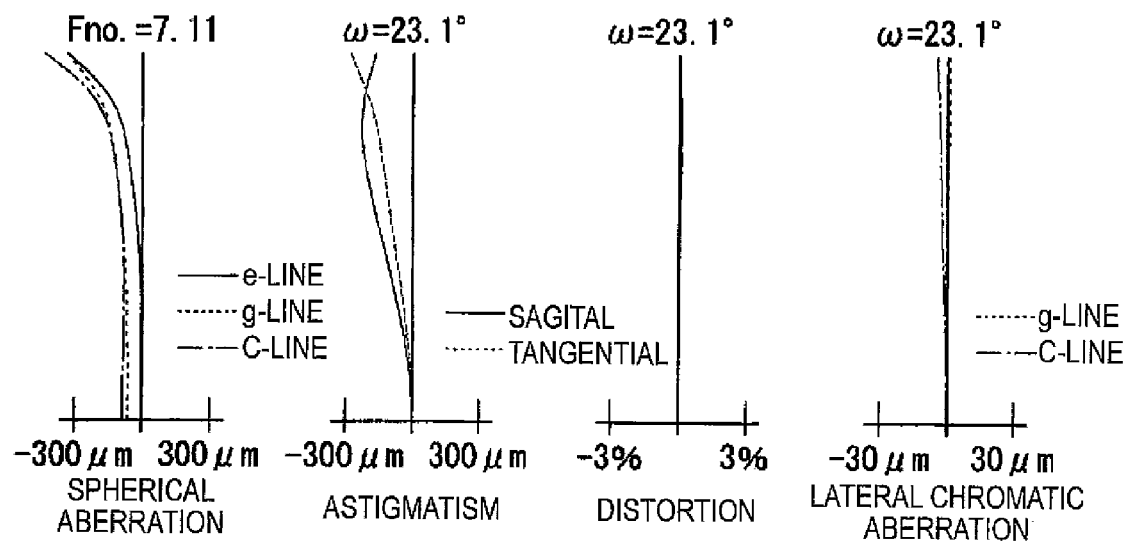
FIGS. 22A to 22D are aberration diagrams showing various aberrations of the color image readout lens according to Example 5, where
Figures 23A, 23B, 23C, 23D:
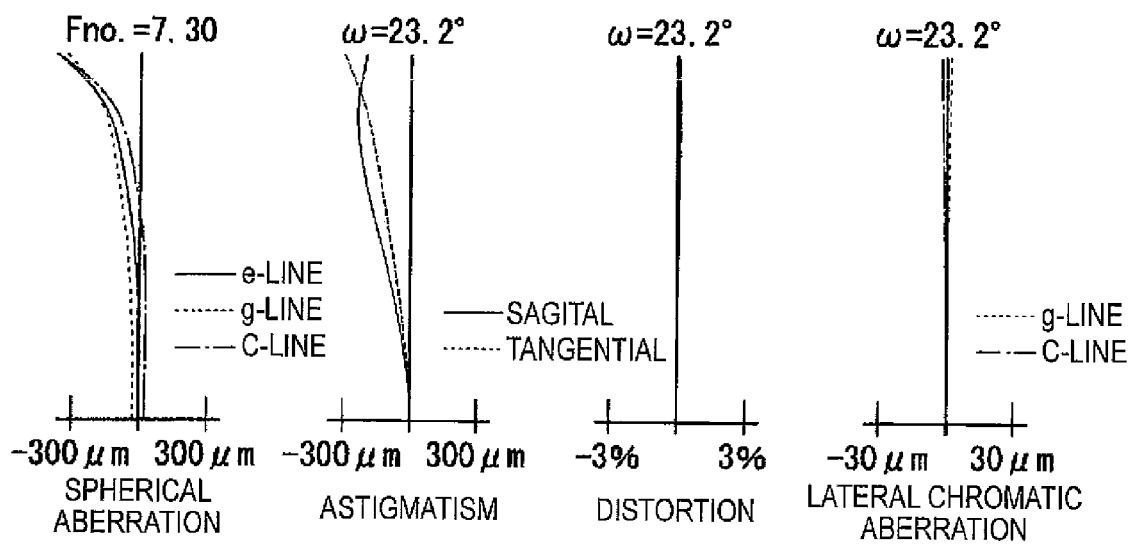
FIGS. 23A to 23D are aberration diagrams showing various aberrations of the color image readout lens according to Example 6, where
Figures 24A, 24B, 24C, 24D:
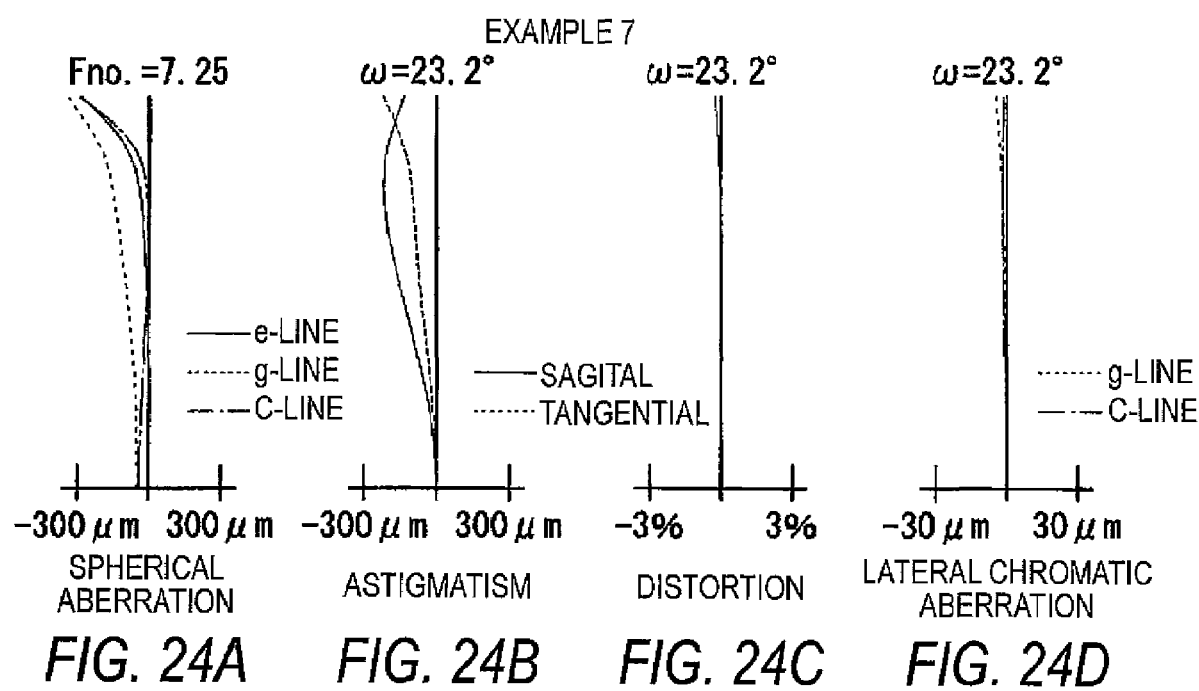
FIGS. 24A to 24D are aberration diagrams showing various aberrations of the color image readout lens according to Example 7, where

In room temperature, the imaging position on which rays are focused by the optical system coincides with the light receiving surface position. When temperature of the optical system varied by, for example, ±T° C. from room temperature, the following factors are considered in the optical system: variation in curvature, a thickness, and a refractive index of lens and variation of a spacer ring and a supporting member. In this case, relationship between a distance S (an amount of the focal deviation) from the imaging position to the light receiving surface position and temperature T is shown in FIG. 16. In Example 2, an amount of the focal deviation S increases proportional to temperature variation. As compared therewith, in Example 7, the amount of the focal deviation S is kept small. The reason is that, in Example 7, a curvature for correcting focal deviation is formed on a surface opposite to the diffraction surface of the diffractive optical element L21.

The results shown in FIG. 16 are estimated values, and do not means that the numerical value measured after temperature variation exactly coincides with the estimated value in all respects. However, the results show that it is possible to estimate the focal deviation amount S after temperature variation, and it is possible to correct the focal deviation caused by temperature variation, for example, when a preferred curvature is formed on the surface opposite to the diffraction surface of the diffractive optical element L21. In calculation example shown in FIG. 16, the focal deviation amount S has a negative value by temperature rise. However, when the focal deviation amount S has a positive value, it is possible to perform the same correction by forming the surface opposite to the diffraction surface of the diffractive optical element L21 in a concave shape.

FIG. 17 shows values of the conditional expressions mentioned above with respect to the examples. As known from FIG. 17, in Examples 1 to 3 and 5 to 6, all the values are in the allowable range of the conditional expressions. In Examples 4 and 7, the values are out of the allowable range of the conditional expression (6), but are in the allowable range of the other conditional expressions. FIG. 17 also shows values of a real F number (Fno.) and a half angle of view ω as data. In addition, the power $\phi$doe of the diffraction surface according to the conditional expression (4) and the power $\phi$all of the color image readout lens are calculated by values with respect to the e-line.

FIGS. 18A to 18D show spherical aberration, astigmatism. distortion, and lateral chromatic aberration, respectively, in the color image readout lens according to Example 1. In the aberration diagrams, aberrations at the time when the e-line is set as a reference wavelength are shown. In the spherical aberration diagram and the lateral chromatic aberration diagram, aberrations with respect to the g-line (a wavelength 435.8 nm) and the C-line (a wavelength 656.3 nm) are also shown. In the astigmatism diagram, the solid line represents a sagittal direction, and the wavy line represents aberrations of a tangential direction. The Fno. represents an F number, and the ω represents a half angle of view.

Likewise, FIGS. 19A to 19D show various aberrations (spherical aberration, astigmatism, distortion, and lateral chromatic aberration), in the color image readout lens according to Example 2. Similarly, FIGS. 20A to 20D show various aberrations in the color image readout lens according to Example 3. Similarly, FIGS. 21A to 21D show various aberrations in the color image readout lens according to Example 4. Similarly, FIGS. 22A to 22D show various aberrations in the color image readout lens according to Example 5. Similarly, FIGS. 23A to 23D show various aberrations in the color image readout lens according to Example 6. Similarly, FIGS. 24A to 24D show various aberrations in the color image readout lens according to Example 7.

In addition, FIGS. 25A to 25E show transverse aberrations for field angles in the color image readout lens according to Example 1. Particularly, FIGS. 25A to 25C show transverse aberrations on the tangential plane, and FIGS. 25D to 25E show transverse aberrations on the sagittal plane. In these transverse aberration diagrams, the e-line is set as the reference wavelength, aberrations with respect to the g-line and C-line are also shown. Similarly, FIGS. 26A to 26E show transverse aberrations of the color image readout lens according to Example 2. Similarly, FIGS. 27A to 27E show transverse aberrations of the color image readout lens according to Example 3. Similarly, FIGS. 28A to 28E show transverse aberrations of the color image readout lens according to Example 4. Similarly, FIGS. 29A to 29E show transverse aberrations of the color image readout lens according to Example 5. Similarly, FIGS. 30A to 30E show transverse aberrations of the color image readout lens according to Example 6. Similarly, FIGS. 31A to 31E show transverse aberrations of the color image readout lens according to Example 7.

As known from the numerical data and the aberration diagrams mentioned above, in each of the examples, there is provided a high-resolution/high-performance lens system which has a simple configuration and in which chromatic aberration is corrected with high accuracy.

In addition, the invention is not limited to the embodiments and the examples, and may be modified to various forms. For example, the values of the radius of curvature, the on-axis surface spacing, and the refractive index in the lens components are not limited to the values shown in the numerical examples, and may have different values.

In addition, the examples show only the cases where a diffractive structure is formed on a complete flat surface as a standard, but in a case where curvature of the surface is sufficiently small and the surface is a substantially flat surface, a diffractive structure may be formed on the curved surface. In addition, the examples show only the cases where each surface of the lenses in the first group G1 and third group G3 is formed as a spherical surface, but at least one surface may be formed as an aspheric surface.

According to the color image readout lens of the invention, the diffractive optical element (the second group) and the normal refractive lens system (the first group and the third group) are appropriately combined with each other. Thus, it is possible to embody a high-resolution/high-performance color image readout lens which has a simple configuration and in which chromatic aberration is corrected with high accuracy.

In addition, the color image readout lens of the invention is configured to output an imaging signal based on an optical image formed by the high-resolution/high-performance color image readout lens of the invention. Therefore, it is possible to read out an image having high resolution.

The entire disclosure of each and every foreign patent application from which the benefit of foreign priority has been claimed in the present application is incorporated herein by reference, as if fully set forth.

What is claimed is:

1. A color image readout lens comprising, in order from an object side:
    a first group comprising a positive lens convex toward the object side and a biconcave negative lens;
    a stop;
    a second group comprising one diffractive optical element that has at least one flat surface and has a diffractive structure formed on the flat surface; and
    a third group comprising a biconvex positive lens and a negative lens concave toward the object side.

2. The color image readout lens according to claim 1, wherein the diffractive optical element comprises:
    a substrate that is a plane parallel plate; and
    a diffractive structure formed on at least one surface of the substrate.

3. The color image readout lens according to claim 2, wherein the color image readout lens satisfies the following conditional expression:

$$50 < vp1 \quad (1),$$

where vp1 is an Abbe number of the positive lens in the first group with respect to the d-line.

4. The color image readout lens according to claim 3, wherein the color image readout lens satisfies the following conditional expressions:

$$1.75 < Np3 \quad (2), \text{ and}$$

$$32 < vp3 < 45 \quad (3),$$

where Np3 is a refractive index of the positive lens in the third group with respect to the e-line, and vp3 is an Abbe number of the positive lens in the third group with respect to the d-line.

5. The color image readout lens according to claim 4, wherein a power of a diffraction surface of the diffractive optical element satisfies the following conditional expression:

$$0.02 < \phi doe/\phi all < 0.09 \quad (4),$$

where $\phi doe$ is a power of the diffraction surface, and is defined as $-\lambda \times C1/\pi$ when a second order coefficient of a phase difference function is represented by C1 and a wavelength of light is represented by $\lambda$, and $\phi all$ is a power of the color image readout lens, and is defined as 1/fa when a focal length of the color image readout lens is represented by fa.

6. The color image readout lens according to claim 5, wherein the diffractive structure of the diffractive optical element comprises a plurality of orbicular zones, and satisfies the following conditional expression:

$$0.70 < N/L < 3.30 \quad (5),$$

where N is the number of the orbicular zones and L is an effective diameter of a surface having the diffractive structure.

7. The color image readout lens according to claim 1, which is to be integrated with a light receiving surface by a holding member,
    wherein the diffractive optical element comprises:
    a substrate having a curved surface and a flat surface facing to the curved surface; and
    a diffractive structure formed on the flat surface, and
    wherein the curved surface has a curvature for suppressing difference between an imaging position varied with an optical focus shift caused by temperature variation and a light receiving surface position varied with mechanical expansion and contraction of the holding member caused by temperature variation, so as to suppress positional deviation of an imaging position and a light receiving surface position caused by temperature variation.

8. The color image readout lens according to claim 7, wherein the color image readout lens satisfies the following conditional expression:

$$50 < vp1 \quad (1),$$

where vp1 is an Abbe number of the positive lens in the first group with respect to the d-line.

9. The color image readout lens according to claim 8, wherein the color image readout lens satisfies the following conditional expressions:

$$1.75 < Np3 \quad (2), \text{ and}$$

$$32 < vp3 < 45 \quad (3),$$

where Np3 is a refractive index of the positive lens in the third group with respect to the e-line, and vp3 is an Abbe number of the positive lens in the third group with respect to the d-line.

10. The color image readout lens according to claim 9, wherein a power of a diffraction surface of the diffractive optical element satisfies the following conditional expression:

$$0.02 < \phi doe/\phi all < 0.09 \quad (4),$$

where $\phi$doe is a power of the diffraction surface, and is defined as $-\lambda \times C1/\pi$ when a second order coefficient of a phase difference function is represented by C1 and a wavelength of light is represented by $\lambda$, and $\phi$all is a power of the color image readout lens, and is defined as 1/fa when a focal length of the color image readout lens is represented by fa.

11. The color image readout lens according to claim 1, wherein the color image readout lens satisfies the following conditional expression:

$$50 < vp1 \quad (1),$$

where vp1 is an Abbe number of the positive lens in the first group with respect to the d-line.

12. The color image readout lens according to claim 1, wherein the color image readout lens satisfies the following conditional expressions:

$$1.75 < Np3 \quad (2), \text{ and}$$

$$32 < vp3 < 45 \quad (3),$$

where Np3 is a refractive index of the positive lens in the third group with respect to the e-line, and vp3 is an Abbe number of the positive lens in the third group with respect to the d-line.

13. The color image readout lens according to claim 1, wherein the diffractive optical element is disposed closer to the aperture diaphragm than any other optical elements.

14. The color image readout lens according to claim 1, wherein the diffractive optical element has a diffractive structure formed on its surface opposite to the other surface facing to the aperture diaphragm.

15. The color image readout lens according to claim 1, wherein a power of a diffraction surface of the diffractive optical element satisfies the following conditional expression:

$$0.02 < \phi doe/\phi all < 0.09 \quad (4),$$

where $\phi$doe is a power of the diffraction surface, and is defined as $-\lambda \times C1/\pi$ when a second order coefficient of a phase difference function is represented by C1 and a wavelength of light is represented by $\lambda$, and $\phi$all is a power of the color image readout lens, and is defined as 1/fa when a focal length of the color image readout lens is represented by fa.

16. The color image readout lens according to claim 1, wherein the diffractive structure of the diffractive optical element comprises a plurality of orbicular zones, and satisfies the following conditional expression:

$$0.70 < N/L < 3.30 \quad (5),$$

where N is the number of the orbicular zones and L is an effective diameter of a surface having the diffractive structure.

17. The color image readout lens according to claim 1, wherein all the lenses constituting the first group and the third group are spherical glass lenses.

18. The color image readout lens according to claim 1, wherein the diffractive optical element is made of plastic.

19. A color image readout apparatus comprising:

the color image readout lens according to claim 1; and an image pickup device that outputs an imaging signal based on an optical image formed by the color image readout lens.

20. A color image readout apparatus comprising:

the color image readout lens according to claim 19; and an image pickup device that outputs an imaging signal based on an optical image formed by the color image readout lens.

\* \* \* \* \*